(12) United States Patent
Morrison et al.

(10) Patent No.: US 9,261,865 B2
(45) Date of Patent: Feb. 16, 2016

(54) DYNAMIC CONSTRAINED OPTIMIZATION OF CHEMICAL MANUFACTURING

(75) Inventors: Timothy Morrison, Houston, TX (US); Michael Sugars, Elgin, TX (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1185 days.

(21) Appl. No.: 12/716,171

(22) Filed: Mar. 2, 2010

(65) Prior Publication Data

US 2010/0161133 A1   Jun. 24, 2010

Related U.S. Application Data

(62) Division of application No. 11/224,844, filed on Sep. 13, 2005.

(51) Int. Cl.
G01N 35/08 (2006.01)
G05B 13/04 (2006.01)
(Continued)

(52) U.S. Cl.
CPC ............. *G05B 13/048* (2013.01); *F25J 3/0219* (2013.01); *F25J 3/0233* (2013.01); *F25J 3/0238* (2013.01); *F25J 3/0242* (2013.01); *F25J 3/0247* (2013.01); *F25J 3/0295* (2013.01);
(Continued)

(58) Field of Classification Search
CPC . F25J 2210/12; F25J 2215/62; F25J 2215/64; F25J 2215/66; F25J 2270/02; F25J 2270/12; F25J 2270/60; F25J 2270/88; F25J 2280/50; F25J 3/0219; F25J 3/0233; F25J 3/0238; F25J 3/0242; F25J 3/024
See application file for complete search history.

(56) References Cited

U.S. PATENT DOCUMENTS

| 6,718,234 B1 | 4/2004 | Demoro et al. |
| 6,934,931 B2 | 8/2005 | Plumer et al. |
| 2003/0046130 A1 | 3/2003 | Golightly et al. |

FOREIGN PATENT DOCUMENTS

| WO | 2004/038535 A2 | 5/2004 |
| WO | 2004/070569 A2 | 8/2004 |

OTHER PUBLICATIONS

Yusof, Khairiyah Mohd et al. Artificial neural netwrk modelling of steady state chemical engineering systems, 2003, Malasia-Japan Seminar on Artificial Intelligence Applications in Industry, Jun. 24-25, 2003, Kuala Lumpur.*

(Continued)

*Primary Examiner* — Robert Xu
(74) *Attorney, Agent, or Firm* — Fletcher Yoder P.C.

(57) ABSTRACT

System and method for chemical manufacture utilizing a dynamic optimizer for a chemical process including upstream and downstream processes. The dynamic optimizer includes a maximum feed calculator, operable to receive one or more local constraints on the downstream processes and one or more model offsets, and execute steady state models for the downstream processes in accordance with the local constraints and the offsets to determine maximum feed capacities of the downstream processes; and a feed coordinator, operable to receive the maximum feed capacities, and execute steady state models for the upstream processes in accordance with the maximum feed capacities and a specified objective function, subject to global constraints, to determine upstream production parameters for the upstream processes, which are usable to control the upstream processes to provide feeds to the downstream processes in accordance with the determined maximum feeds and the objective function subject to the global constraints.

35 Claims, 11 Drawing Sheets

(51) Int. Cl.
 *F25J 3/02* (2006.01)
 *G05B 19/418* (2006.01)
(52) U.S. Cl.
 CPC ...... *G05B 19/41865* (2013.01); *F25J 2210/12* (2013.01); *F25J 2215/62* (2013.01); *F25J 2215/64* (2013.01); *F25J 2215/66* (2013.01); *F25J 2270/02* (2013.01); *F25J 2270/12* (2013.01); *F25J 2270/60* (2013.01); *F25J 2270/88* (2013.01); *F25J 2280/50* (2013.01); *Y10T 436/12* (2015.01)

(56) References Cited

OTHER PUBLICATIONS

International search report and written opinion for application No. PCT/US2006/035419 mailed Jan. 19, 2007.
U.S. Appl. No. 09/827,838, filed Apr. 5, 2001, Plumer et al.
U.S. Appl. No. 10/225,093, filed Aug. 21, 2002, Golightly et al.

\* cited by examiner

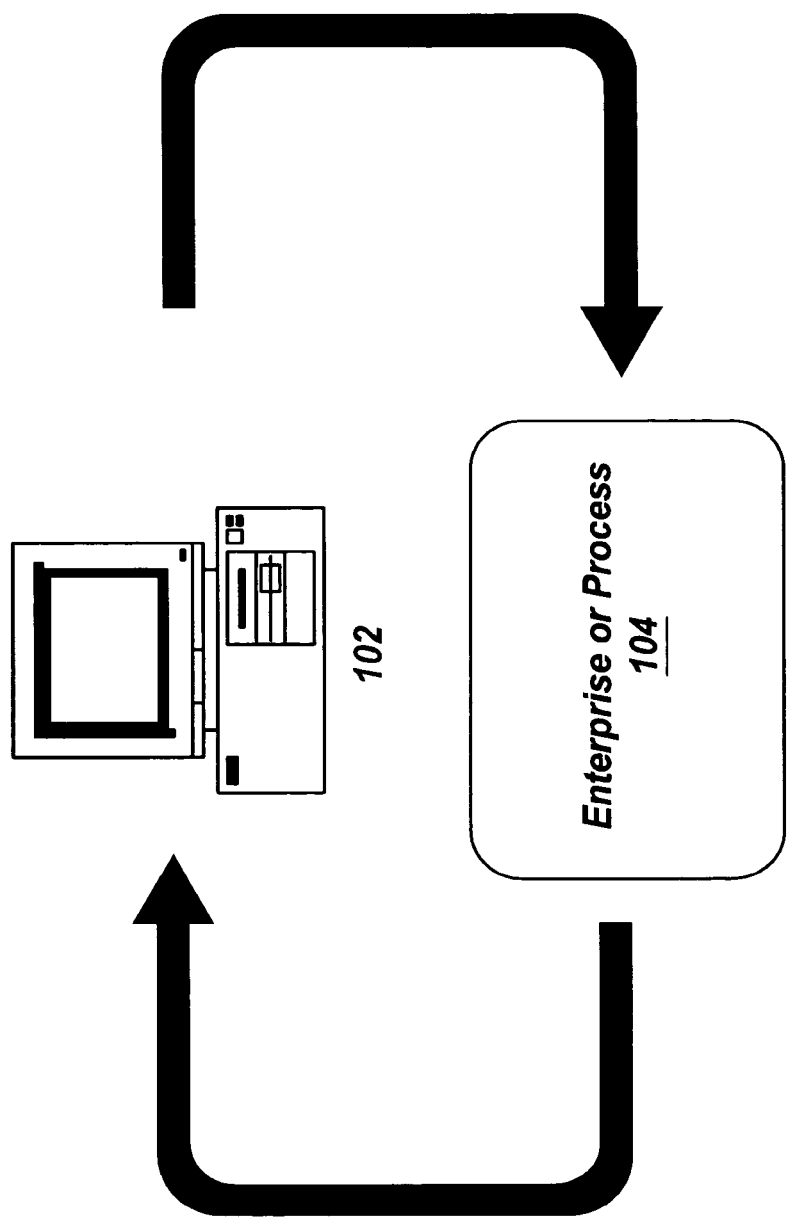

DYNAMIC CONSTRAINED OPTIMIZATION OF CHEMICAL MANUFACTURING

CROSS-REFERENCE TO RELATED APPLICATIONS

This application is a Divisional of application Ser. No. 11/224,844, filed Sep. 13, 2005, entitled "Dynamic Constrained Optimization of Chemical Manufacturing" in the name of Timothy Morrison et al.

FIELD OF THE INVENTION

The present invention generally relates to the field of chemical production. More particularly, the present invention relates to systems and methods for optimizing chemical production in a manufacturing process with downstream and/or upstream constraints using predictive control methodologies.

DESCRIPTION OF THE RELATED ART

Like any other commercial enterprise, those in the business of producing chemical products desire to maximize efficiencies and profitability, while meeting various constraints, such as, for example, raw material and energy costs, plant equipment limitations, product prices, and so forth. The ability to produce chemicals in such a manner may be further complicated for chemical plants producing more than one grade or type of chemical product.

As shown in prior art FIG. 1, a chemical plant 104 may produce chemicals, including, for example, olefin, gasoline, and fuel oil, among others, of varying grades, from feedstock, e.g., naphtha, heavy oil, liquefied petroleum gas (LPG), and ethane, among others. Typically, a chemical plant 104 includes reactors (e.g., furnaces) that make the product followed by separation equipment such as distillation columns to recover the product. The reactors/furnaces are generally referred to as the "hot side" or "hot section" of the plant or plant unit, while the separation portion is referred to as the "cold side" or "cold section" of the plant or unit. It should be noted, however, that these terms are not intended to limit the application of the techniques disclosed herein to any particular chemical process. Rather, the various techniques described are contemplated as being broadly applicable to any process that includes an upstream process, e.g., a reactor process, and a downstream process, e.g., a separation process.

A chemical plant 104 may employ one or more processing lines that are capable of transforming raw materials 101 into chemical products 103, e.g., olefin, gasoline, fuel oil, etc. One processing line may be capable of producing two or more different grades of chemicals, or even two or more different types of chemicals. For example, production of a first product, e.g., olefin, may also result in production of a second product, e.g., ethane, as a byproduct or impurity. This secondary product may itself be valuable, e.g., as a saleable product, or as feedstock for further processing.

Such systems and processes, especially those that utilize multiple feed/product streams, are characterized by the fact that many different inter-related parameters contribute to the behavior of the system or process. It is often desirable to determine values or ranges of values for some or all of these parameters that correspond to beneficial behavior patterns of the system or process, such as safety, profitability, efficiency, etc. However, the complexity of most real world systems generally precludes the possibility of arriving at such solutions analytically, i.e., in closed form. Therefore, many analysts have turned to predictive models and optimization techniques to characterize and derive solutions for these complex systems or processes.

Predictive models generally refer to any representation of a system or process that receives input data or parameters related to system or model attributes and/or external circumstances/environment and generates outputs indicating the behavior of the system or process under those parameters. In other words, the model or models may be used to predict behavior or trends based upon previously acquired data. There are many types of predictive models, including linear, non-linear, analytic, and empirical models, among others, several types of which are described in more detail below.

Optimization generally refers to a process whereby past (or synthesized) data related to a system or process are analyzed or used to select or determine optimal parameter sets for operation of the system or process. For example, the predictive models mentioned above may be used in an optimization process to test or characterize the behavior of the system or process under a wide variety of parameter values. The results of each test may be compared, and the parameter set or sets corresponding to the most beneficial outcomes or results may be selected for implementation in the actual system or process.

FIG. 2A illustrates a general optimization process as applied to an industrial process 104, such as a manufacturing plant, according to the prior art. It may be noted that the optimization techniques described with respect to the manufacturing plant are generally applicable to all manner of systems and processes.

As FIG. 2A shows, the operation of the process 104 generates information or data 106 that is typically analyzed and/or transformed into useful knowledge 108 regarding the system or process. For example, the information 106 produced by the process 104 may comprise raw production numbers for the plant that are used to generate knowledge 108, such as profit, revenue flow, inventory depth, etc. This knowledge 108 may then be analyzed in the light of various goals and objectives 112 and used to generate decisions 110 related to the operation of the system or process 104 subject to various goals and objectives 112 specified by the analyst. As used herein, an "objective" may include a goal or desired outcome of an optimization process. Example goals and objectives 112 may include or involve profitability, schedules, energy use, inventory levels, cash flow, production, or any other attribute that the user may wish to minimize or maximize. These goals and objectives 112 may be used to select from among the possible decisions 110, where the decisions may comprise various parameter values over which the user may exercise control. The selected decision(s) may then determine one or more actions 114 to be applied to the operation of the system or process 104. The subsequent operation of the system or process 104 then generates more information 106, from which further knowledge 108 may be generated, and so on in an iterative fashion. In this way, the operation of the process 104 may be "tuned" to perform in a manner that most closely meets the goals and objectives of the business or enterprise.

FIG. 2B illustrates an optimization system where a computer based optimization system 102 operates in conjunction with a process 104 to optimize the process, according to the prior art. In other words, the computer system 102 executes software programs (including computer based predictive models) that receive process data 106 from the process 104 and generate optimized decisions and/or actions that may then be applied to the process 104 to improve operations based on the goals and objectives.

Thus, many predictive systems may be characterized by the use of an internal model that represents a process or system 104 for which predictions are made. FIG. 3A illustrates a number of predictive model types usable in optimization systems, according to the prior art. As mentioned above, predictive model types may be linear, non-linear, stochastic, or analytical, among others. However, for complex phenomena non-linear models may generally be preferred due to their ability to capture non-linear dependencies among various attributes of the phenomena. Examples of non-linear models may include neural networks and support vector machines (SVMs).

As FIG. 3A shows, the types of models used in optimization systems include fundamental or analytic models 302 that use known information about the process 104 to predict desired unknown information, such as product conditions and product properties. A fundamental model may be based on scientific and engineering principles. Such principles may include the conservation of material and energy, the equality of forces, and so on. These basic scientific and engineering principles may be expressed as equations that are solved mathematically or numerically, usually using a computer program. Once solved, these equations may give the desired prediction of unknown information.

Conventional computer fundamental models have significant limitations, such as:

(1) They may be difficult to create since the process may be described at the level of scientific understanding, which is usually very detailed;

(2) Not all processes are understood in basic engineering and scientific principles in a way that may be computer modeled;

(3) Some product properties may not be adequately described by the results of the computer fundamental models; and (4) The number of skilled computer model builders is limited, and the cost associated with building such models is thus quite high.

These problems result in computer fundamental models being practical only in some cases where measurement is difficult or impossible to achieve.

As also shown in FIG. 3A, empirical models 304, also referred to as computer-based statistical models, may be used to model the system or process 104 in an optimization system. Such models typically use known information about process to determine desired information that may not be easily or effectively measured. A statistical empirical model may be based on the correlation of measurable process conditions or product properties of the process. Examples of computer-based empirical or statistical models include neural networks and support vector machines (SVMs).

For one example of a use of a computer-based statistical model, assume that it is desired to be able to predict the color of a plastic product. This is very difficult to measure directly, and takes considerable time to perform. In order to build a computer-based statistical model that may produce this desired product property information, the model builder would need to have a base of experience, including known information and actual measurements of desired unknown information. For example, known information may include the temperature at which the plastic is processed. Actual measurements of desired unknown information may be the actual measurements of the color of the plastic.

A mathematical relationship (i.e., an equation) between the known information and the desired unknown information may be created by the developer of the empirical statistical model. The relationship may contain one or more constants (which may be assigned numerical values) that affect the value of the predicted information from any given known information. A computer program may use many different measurements of known information, with their corresponding actual measurements of desired unknown information, to adjust these constants so that the best possible prediction results may be achieved by the empirical statistical model. Such a computer program, for example, may use non-linear regression.

Computer-based statistical models may sometimes predict product properties that may not be well described by computer fundamental models. However, there may be significant problems associated with computer statistical models, which include the following:

(1) Computer statistical models require a good design of the model relationships (i.e., the equations) or the predictions may be poor;

(2) Statistical methods used to adjust the constants typically may be difficult to use;

(3) Good adjustment of the constants may not always be achieved in such statistical models; and (4) As is the case with fundamental models, the number of skilled statistical model builders is limited, and thus the cost of creating and maintaining such statistical models is high.

As FIG. 3A also shows, predictive model types also include procedural or recipe based models 306. These models typically comprise a number of steps whose performance emulates or models the phenomenon or process. Thus, procedural or recipe models are not based on understanding of the fundamental processes of a system, but instead, are generally constructed with an empirical or emulative approach.

Generally, a model is trained with training data, e.g., historical data, in order to reflect salient attributes and behaviors of the phenomena being modeled. In the training process, sets of training data may be provided as inputs to the model, and the model output may be compared to corresponding sets of desired outputs. The resulting error is often used to adjust weights or coefficients in the model until the model generates the correct output (within some error margin) for each set of training data. The model is considered to be in "training mode" during this process. After training, the model may receive real-world data as inputs, and provide predictive output information that may be used to control or make decisions regarding the modeled phenomena.

In one application of optimization techniques, predictive models may be used by a controller (or even a human decision-maker) to select an optimal course of action or optimal course of decision. The optimal course of action or decision may include a sequence or combination or actions and/or decisions. For example, optimization may be used to select an optimal course of action for production of one or more products.

As used herein, "control variables" (or "controlled variables") (CVs) are those variables that the controller or decision-maker tries to bring to some objective—e.g. target, maxima, etc. As used herein, "manipulated variables" (MVs) are those variables that the controller or decision-maker may change to affect the outcome of the optimization process 100, specifically, to achieve the objectives for the CVs. For example, in an optimization of a credit card offer conducted by a credit card issuer, Annual Percentage Rate (APR) and credit limit may be manipulated variables. As used herein, "disturbance variables" (DVs) are those variables that are not under the control of the controller or decision-maker. In other words, the disturbance variables are not changed in the decision process but rather are taken as givens. For example, in the credit card issuer example, disturbance variables may include variables such as customer addresses, customer income levels, customer demographic information, bureau data, transaction file data, cost of funds and capital, and other suitable variables. As another example, in a chemical plant application, disturbance variables may include variables such as market prices of raw materials or products, ambient conditions, energy costs or availability, and so forth.

In general, the process of optimization may include determining which variables in a particular problem are most predictive of a desired outcome, and what treatments, actions, or mix of variables under the controller's or decision-maker's control (i.e., manipulated variables) may optimize the specified value. For example, in a chemical plant, optimal temperatures, feed mixes, etc., may be applied to maximize production of saleable products.

FIG. 3B is a block diagram of a predictive model 315 as used in an optimization system 100, according to the prior art. As FIG. 3B shows, the model 315 may receive input in the form of disturbance variables 312 and manipulated variables 314, defined above, and generate action variables 318. As used herein, "action variables" are those variables that propose or suggest a set of actions for an input set of decision and disturbance variables. In other words, the action variables may comprise predictive metrics for a behavior. For example, in the optimization of chemical production, the action variables may include the amount of saleable product per unit of feedstock. In the optimization of a credit card offer, the action variables may include predictions of balance, attrition, charge-off, purchases, payments, and other suitable behaviors for the customer of a credit card issuer.

Thus, predictive models may be used for analysis, control, and decision making in many areas, including manufacturing, process control, plant management, quality control, optimized decision making, e-commerce, financial markets and systems, or any other field where predictive modeling may be useful.

FIGS. 4A and 4B illustrate a general optimization system and process using predictive models with an optimizer to generate optimal manipulated variables, according to the prior art.

FIG. 4A is a block diagram that illustrates an overview of optimization according to the prior art. As shown in FIG. 4A, an optimization process 100 may accept the following elements as input: information 402, such as customer information records 402, predictive model(s) such as customer model(s) 404, one or more constraints and/or objectives 406. As used herein, a "constraint" may include a limitation on the outcome of an optimization process. Constraints are typically "real-world" limits on the manipulated variables and are often critical to the feasibility of any optimization solution. For example, control of resources, energy, and capital, or other factors germane to financial effects or results may be involved in setting constraints that accurately represent their real-world environments. Setting such constraints may realistically restrict the allowable values for the manipulated variables. The optimization process 100 may produce as output an optimized set of manipulated variables 412.

FIG. 4B illustrates data flow in the optimization system of FIG. 4A. As FIG. 4B shows, input information 202 typically includes manipulated variables 214 and disturbance variables 212, as described above. The information 402, including manipulated variables 214 and disturbance variables 212, is input into the predictive model(s) 404 to generate the action variables 218. The predictive model(s) 404 may include process model(s) as well as other models. The predictive model(s) 404 can take any of several forms, as described above, including trained neural nets, support vector machines, statistical models, analytic models, and any other suitable models for generating predictive metrics, and may take various forms including linear or non-linear, or may be derived from empirical data or from managerial judgment.

As FIG. 4B shows, the action variables 318 generated by the model(s) 404 are used to formulate constraint(s) and the objective function 406 via formulas. For example, a data calculator 420 generates the constraint(s) and objective 406 using the action variables 318 and potentially other data and variables. The formulations of the constraint(s) and objective 406 may include physical formulas such as formulas for determining reaction rates, viscosity, melting points, and so forth. The constraint(s) and objective 406 may be input into an optimizer 324, that may comprise, for example, a custom-designed process or a commercially available "off the shelf" product. The optimizer may then generate the optimal manipulated variables 412 that have values optimized for the goal specified by the objective function and subject to the constraint(s) 406.

FIG. 5 illustrates a simplified optimization system according to the prior art, where a computer based optimization system 502 operates in conjunction with an enterprise or process 504 to optimize the process. In other words, the computer system 502 executes software programs (including computer based predictive models) that receive process data from the process 504, as shown by arrow 503 and generate optimized decisions and/or actions that may then be applied to the process 504 to improve operations, as shown by arrow 505. The dynamic model feedback 506, shown within the process 504, allows real-time data to be used as input to generate improved versions of optimized decisions and/or actions. In turn, the improved versions of optimized decisions and/or actions may then be applied to the process 504 to improve operations.

In traditional APC in an olefins plant, different practitioners may group equipment differently in an effort to account for process interactions and properly manage process constraints. Various software products have been used successfully to implement APC in olefins units, generally consisting of some combination of dynamic and steady state models of the section of the unit to be controlled, and manipulating model inputs to maintain controlled variables at targets or within constraints. Traditionally, optimization has involved very large, rigorous, steady state models of the entire olefins unit. These models attempt to capture all interactions among all process equipment. In addition to the cost involved in developing the models, this approach suffers from the following deficiencies:

a) The optimizer models rarely produce the same results as the APC models, causing conflict between optimization goals and APC goals.

b) Purely steady state models must be reconciled to the actual process by adjusting parameters or model biases based on comparisons at steady state conditions. This means the models can only be executed when the unit is at steady state, which is a rare condition for an olefins unit.

c) Most traditional optimization models are very susceptible to instrumentation error. It is common to find a complex data reconciliation function adjusting inputs to the model before it is executed.

d) Optimum conditions are not fully implemented due to the conflicts between the optimizer models and the APC models.

As an example, an olefins unit produces light olefins (C2 through C4 typically) by cracking of feedstocks in furnaces in the presence of steam. The cracked gas is compressed, cooled, and sent to the cold section for separation. The cold section consists primarily of an integrated set of distillation columns and refrigeration compressors. The composition of the furnace effluent, or cracked gas, is determined primarily by feedstock composition, furnace design, and cracking severity. Typically, there are several furnaces in an olefins unit, each operated independently, often utilizing different types of feedstock. Feedstocks are chosen based on availability and cost.

FIG. 6 is a simplified olefins plant process flow diagram illustrating basic processes of the hot and cold sections of an exemplary olefins plant, according to the prior art. As FIG. 6 shows, in the hot section, feedstock, e.g. naphtha, butane, propane, ethane, etc., may be provided to multiple hydrocarbon cracking furnaces. As is well-known, these furnaces may operate to crack the feedstocks, thereby generating a mixture of hydrocarbon products. As indicated, an initial separation process may be performed in the hot section using oil and water quenching to generate heavy gasoline, and the byproducts provided as input to the cold section. These byproducts may be processed by a series of refrigeration/distillation units to extract various products from the mix. For example, the byproducts may be provided to a multistage compressor with condensate recovery, which output may then be provided to a chilling train and demethanizer. As shown, hydrogen and methane may thus be extracted and the byproducts passed to a deethanizer, which may extract ethane and ethylene and pass the mixture to an ethylene fractionator, which may extract ethylene as a product, and recycle any remaining ethane, which is then provided as feedstock to the hot side. Byproducts from the deethanizer may be passed to a depropanizer, which extracts propane and propylene and pass the mixture to a propylene fractionator, which may then extract propylene and propane as products. The byproducts of the depropanizer may be provided to a debutanizer, which may produce mixed butanes and light gasoline as products.

Note that the cold section is designed to recover products for sale or for use in downstream chemical manufacturing plants. For example, fuel gas, a mixture of hydrogen and methane, is recovered in the cold section and burned in the furnaces. Ethane is recovered in the cold section and recycled as feedstock to the furnaces. Ethane is recycled to extinction. Most products from the cold section are saleable products with maximum impurity specifications. Optimization of relative production rates is a simple value function based on market price of the product and cost of feedstock. Optimization of the distillation columns comprising the cold section involves balancing energy use with the cost associated with impurities in the top and bottom products. In general, improving separation to reduce impurities requires more energy. If both the top and bottom streams from a distillation column are saleable products then the "optimum" operating point for the column is at the maximum impurities allowed in both streams, which is equivalent to the minimum energy use. These types of columns are typically "optimized" by setting impurity targets in an advanced process controller (APC). However, certain streams allow variability in composition that could be exploited to reduce energy consumption and also to produce additional quantities of more valuable products. An example is the bottoms of an ethylene fractionator separating ethylene from ethane. The ethane from the bottom of the column is recycled to the furnaces and is typically cracked at 60 to 70 percent conversion. When this column is the bottleneck in the plant, allowing additional ethylene in the bottom could result in additional total olefins production. But when this is not the bottleneck, lower concentrations reduce ethylene losses in the recycle and increase total olefins production. This is a more complex optimization problem requiring knowledge of column constraints and interactions with other process equipment. Prior art approaches to process control and optimization have not adequately addressed these issues.

SUMMARY

Various embodiments of a system and method for chemical manufacture are presented. In one embodiment, a dynamic optimizer may operate in conjunction with standard section control applications to optimize a chemical process (in a chemical plant) including upstream and downstream processes, e.g., a hot side and a cold side, such as an olefins production plant. The dynamic optimizer preferably includes two main parts: a maximum feed calculator that operates to perform a maximum feed calculation for each area of the cold section, and a feed coordinator, preferably an integrated controller/optimizer (ICO) that specifies or implements control strategies for the hot-side of the process, e.g., setting targets for feed flow, cracking severity, etc., for the hot-side ICOs. These two portions of the dynamic optimizer may communicate with the standard section control applications, e.g., ICOs controlling furnaces on the hot-side, and ICOs controlling equipment on the cold side of each processing unit. Note that each ICO preferably includes a steady-state model of the process or sub-process being controlled. Each steady-state model may include steady-state offsets or biases that normalize the model's predictions to actual operating values.

First, maximum feed capacities of a plurality of downstream processes in a chemical plant may be determined subject to one or more local constraints on the downstream processes. In other words, a maximum feed calculation may be performed to determine maximum feeds for each of the plurality of downstream processes, e.g., for each cold-side section, e.g., for each of a plurality of refrigeration units/distillation columns, taking into account one or more limits on the processes, such as, for example, pressure drop across a distillation column, valve positions, and refrigeration compressor drive amperage, among others. In one embodiment, the maximum feed calculation may be performed by an analysis engine, such as a real-time analysis engine (RAE), in conjunction with one or more steady-state models of the cold-side processes, e.g., models comprised in respective cold-side ICOs.

Thus, the maximum feed calculation preferably uses steady-state models from the cold side section ICOs. For example, a downstream optimizer may execute the steady state models under a variety of conditions or states to determine a solution (the maximum feeds), as is well known in the art of constrained optimization. Note that in various embodiments, respective ICOs preferably control respective cold side units (e.g., distillation columns), although in other embodiments, one or more ICOs may cover multiple units, or, an ICO may cover the entire cold section. Each ICO application is preferably configurable to improve operation of individual units subject to local process constraints (e.g., maximum feed rates, etc.).

As is well known in the art of constrained optimization, control (or controlled) variables (CVs) are variables that the ICO maintains either at a setpoint or within maximum or minimum limits. It accomplishes this by adjusting manipulated variables (MVs). In other words, MVs are variables that the ICO adjusts, and are typically the setpoints of distributed control system (DCS) controllers. Disturbance variables (DVs) are those variables that affect the process but are not adjustable by the controller itself. Examples of CVs in a cold-side ICO include amount of methane in the ethylene product, amount of ethane in the bottom of the deethanizer, depropanizer pressure drop, and demethanizer reboil valve position, among others. Examples of MVs in a cold section ICO include reboil flow rate, reflux flow rate, ethylene compressor suction pressure, and refrigerant level in a chilling train heat exchanger, among others. Examples of DVs in a cold section ICO include column feed rate, cooling water temperature, and column pressure, among others.

In some embodiments, a typical cold side section ICO where all product streams are saleable products may include targets for impurities that are ideally set three standard deviations below product specifications. Operating at these targets may minimize energy consumption. Of course, in other embodiments, targets may be set otherwise as desired. In some embodiments, a typical cold side section ICO where one or more product streams are used internally may contain additional degrees of freedom. In some cases the trade-off between energy costs and the value of saleable product recovered may be neither constant nor obvious. These trade-offs may thus be most appropriately managed by the ICO application either through local optimization or specific tuning of targets and constraints.

The dynamic optimizer is primarily concerned with the maximum feed rate each area of the cold side section can handle. Typically, even stream compositions that are not fixed by product specifications have some practical limit. Thus every cold side section ICO, even those that allow stream compositions to vary, is capable of calculating a maximum feed rate. The feed maximization calculation preferably executes each ICO steady-state model in optimization mode with the feed rate as an MV. If product pricing is not used in the ICO the feed may be provided a price to encourage the optimizer to maximize it.

The feed maximization calculation may be matched to the plant by utilizing the feedback biases (e.g., steady state offsets) from the ICOs. In this way, the calculation may be matched to the plant by the controllers themselves, thus ensuring consistency between the steady state feed maximization and control models. Additionally, the CV and MV targets and limits used in the feed maximization calculation are preferably obtained directly from the ICOs.

The steady state models may be implemented using a variety of approaches, including neural networks, support vector machines, and so forth. One benefit of a neural network (NN) based ICO architecture is that if the steady-state model is a neural network model, it can be solved for outputs given a set of inputs, or conversely, for inputs given a set of target outputs. Constraints and prices may be applied to guide the solution. Additionally, several NN models may be combined into one model. In the case of the feed maximization calculation, the model may be solved for a set of inputs (the controller MVs and DVs), which achieve maximum feed rate while respecting the controller's CV targets and limits and the MV limits. In preferred embodiments, feed is treated as a manipulated variable in this calculation and assigned a positive price, which encourages it to be increased. Note that in the case where there are multiple ICOs in the cold side section, it may not be necessary to combine models as long as the feed flow to each section is included as a DV in that section's ICO.

In preferred embodiments, the model(s) may be run or executed in a single instance of the maximum feed calculator. The output of these calculations may include a set of feed flows for each section that would allow it to achieve all targets but subject to a limiting constraint. For example, if the section were a single distillation column, the maximum feed would be that which allowed maintaining the top and bottom target compositions while reaching another constraint such as maximum reflux/reboil or maximum column pressure drop.

In some embodiments, achieving a desired set of operating modes may simply be a matter of configuration of the constraints and targets. For example, if it is desired to minimize the bottom composition when the column is not limiting but to allow this composition to be sacrificed to some extent to achieve a higher feed rate, the maximum allowable bottoms content may be passed as the target to the feed maximization calculation while the lower target may be used by the ICO during control calculations and tuned to be sacrificed if necessary. Thus, each cold side ICO may provide steady state (SS) biases and targets and/or limits to the RAE for use in calculating maximum feed values for each cold side section. The RAE (or functional equivalent) may then determine feed targets, i.e., the maximum feed capacities, for each of the cold-side sections, as described above.

Then, upstream production parameters for the plurality of upstream processes may be determined in accordance with the determined maximum feed capacities and a specified objective function, subject to one or more global constraints. For example, in an olefins production example, where the upstream process comprise a plurality of furnaces (reactors), the upstream production parameters may include one or more of: operating temperatures, feed rates (for one or more types of feedstock) for each furnace, or any other operating parameters or attributes germane to operation of the upstream processes. Examples of an objective function include (but are not limited to) profitability, schedule, feedstock use, energy use or efficiency, optimal product mix, and so forth. Note that in some embodiments, the objective function may be more complicated, e.g., may be a combination of different aspects, e.g., an optimal product mix based on product pricing, or any other function as desired. In one embodiment, the optimal product mix may specify one or more of: ethylene production setpoint(s), propylene production setpoint(s), and one or more C4+ production setpoints, among others. Examples of global constraints include (but or not limited to) total feedstock flow of each of a plurality of feedstocks, the ratio of each of the plurality of feedstocks to the total feed, and the maximum difference between individual upstream feeds and the average of the upstream feeds, among others.

In preferred embodiments, the upstream production parameters may be determined via constrained optimization techniques. For example, similar to the downstream constrained optimization process described above, an upstream optimizer may execute a plurality of steady state models of the upstream processes under a variety of conditions or states to determine a solution (the upstream production parameters). Note that in various embodiments, respective ICOs preferably control respective upstream (hot side) units (e.g., furnaces), although in other embodiments, one or more ICOs may cover multiple units, or, an ICO may cover the entire hot section. Each ICO application is preferably configurable to improve operation of individual units subject to local process constraints. Thus, the RAE may transmit cold side section feed targets to the feed coordinator. The feed coordinator may receive additional information regarding feed availability (feed available switches) for each furnace, and may determine hot-side targets (i.e., CVs), e.g., feed flow, cracking severity, etc., for each furnace ICO.

Note that in preferred embodiments, the maximum feeds to each area of the cold section may be determined by executing the steady state models of the cold side ICOs in optimization mode with the feeds treated as manipulated variables (MVs). Appropriate prices may be set so that the optimizer will increase component feeds in proportion to their values until all degrees of freedom in the APC are used. The steady-state model for each cold side ICO may be matched to the plant by mapping the ICO steady-state biases to the appropriate biases in the steady-state model. MV and controlled variable (CV) limits and targets may also be mapped to the steady-state model. In performing the feed maximization calculation for a section, the maximum feed calculator may use the same model as the section's ICO, thus ensuring consistency. This approach may guarantee that each section's controller is capable of maintaining its CV targets at the feed rate and feed composition delivered by the feed coordinator.

The feed coordinator is thus preferably an ICO that may operate as a "master" controller for the furnace ICOs, setting their feed and severity targets. The primary goal is to achieve the maximum feed for each area of the cold section subject to furnace constraints and feedstock availability. A significant advantage of using a dynamic controller in the feed maximization is the use of dynamic models, which may allow closer approach to the maximum feed limit for each downstream section.

As noted above, a primary objective of the present invention is to achieve the maximum allowable feed to each downstream section of the plant. Note that if the ICO is allowed to move multiple feedstocks and/or furnace severities, it may be possible to achieve multiple downsteam constraints. Thus, the feed coordinator may set targets for the furnace ICO applications to control the cold side section feed rates to the maximum feed targets (determined from the feed maximization calculation). The targets set by the feed coordinator may include feed and/or severity targets, among others. Severities and/or feed types may be adjusted to vary the relative flow to different sections so as to maximize the feed to each section until all degrees of freedom are used. In some embodiments, switches in each furnace controller may allow the operator (or controller) to determine which feeds are available to be adjusted.

The feed coordinator may include dynamic models between the furnace MVs and the cold side section feeds. The maximum cold side section feeds (determined from the feed maximization calculation) may be the primary CVs for the feed coordinator. The feed coordinator may be configured to achieve a variety of objectives. For example, if it is desired to maximize only one feed type, then only furnaces running that feed type may be put under feed coordinator control. If multiple feed types are to be maximized, all furnaces with those feed types may be put under feed coordinator control.

In some embodiments, with no other configuration provided, the feed coordinator may tend to increase the feed that gives the greatest increase in the section feeds. Priority may be given to the different feeds via the use of different tuning parameters. However, in some embodiments, for maximum benefit it may be better not to enforce any particular priority, thus allowing the controller to determine the combination of feeds that best fills the capacity of all sections of the plant subject to the available degrees of freedom.

If more control over the solution is desired, constraints and/or targets may be added to or specified for the controller. Standard CVs for controlling the solution may include (but are not limited to):

Maximum difference between individual furnace feeds and the average—Setting this target at zero may tend to keep all furnaces at the same feed rate. The actual difference may deviate from zero as individual furnaces become limited but there may be some penalty for allowing the difference to become very large. Alternatively, this variable may be kept between limits, thus allowing the controller more freedom to shift feeds but still remain within acceptable bounds.

Each feedstock total as a percentage of the total—This variable may be useful for cases where it is desired to maintain a given feedstock as a percentage of the total by setting a desired target or to keep that percentage between some bounds using minimum and maximum fuzzy limits. In some embodiments, target feed rates may be determined based a specified priority, e.g., from a user or external process, and/or the economic value of resulting products.

Total flow of each feed type—This variable may be used to ensure that the solution consumes at least the minimum amount of a feedstock but not more than is available. For a given feed type, the change in cold side section feeds for a unit change in furnace feed may be the same. Consequently, all furnaces of that feed type may tend to be moved equivalently.

Specific olefins production rates—This variable may be used to allow the dynamic optimizer to achieve target production rates when 100% plant utilization is not desired, and may also provide a means for maximizing the more valuable olefins (for example) streams when all areas of the cold side section can not be loaded. This may be particularly useful when the throughput is limited by furnace operation. The setpoints may be tuned based on relative prices of products. If it is anticipated that these will change often, then tuning parameters may be calculated based on prices read from an external database. Optionally, setpoints may be replaced with a combination of min/max constraints and prices (e.g., read from an external database).

Then, the plurality of upstream processes in the chemical plant may be controlled in accordance with the determined upstream production parameters, thereby facilitating production of the optimal product mix by the chemical plant in accordance with the specified objective. In other words, the upstream process, e.g., furnaces, may be operated in a manner that makes maximum use of the downstream processes in attempting to meet the specified objective subject to various constraints (e.g., local and/or global). Said another way, the determining maximum feed capacities, the determining upstream production parameters, and the controlling the plurality of upstream processes may implement overall chemical plant steady state optimization via one or more multivariable predictive dynamic controllers adjusting operational targets in the reactors, including target feed rates, to achieve optimum feed rates and product mix in the separation and purification processes. The hot-side ICOs may then operate in accordance with the provided targets, moving hot-side MVs as needed to meet the targets. In this manner, the furnaces may be operated in such as way as to maximize feeds to the cold side sections in accordance with the maximum feed calculations of the RAE.

BRIEF DESCRIPTION OF THE DRAWINGS

A better understanding of the present invention can be obtained when the following detailed description of various embodiments is considered in conjunction with the following drawings, in which:

FIG. 2B illustrates an optimization system where a computer based optimization system 102 operates in conjunction with a process to optimize the process, according to the prior art;

DETAILED DESCRIPTION OF SEVERAL EMBODIMENTS

Incorporation by Reference

Figure 1:
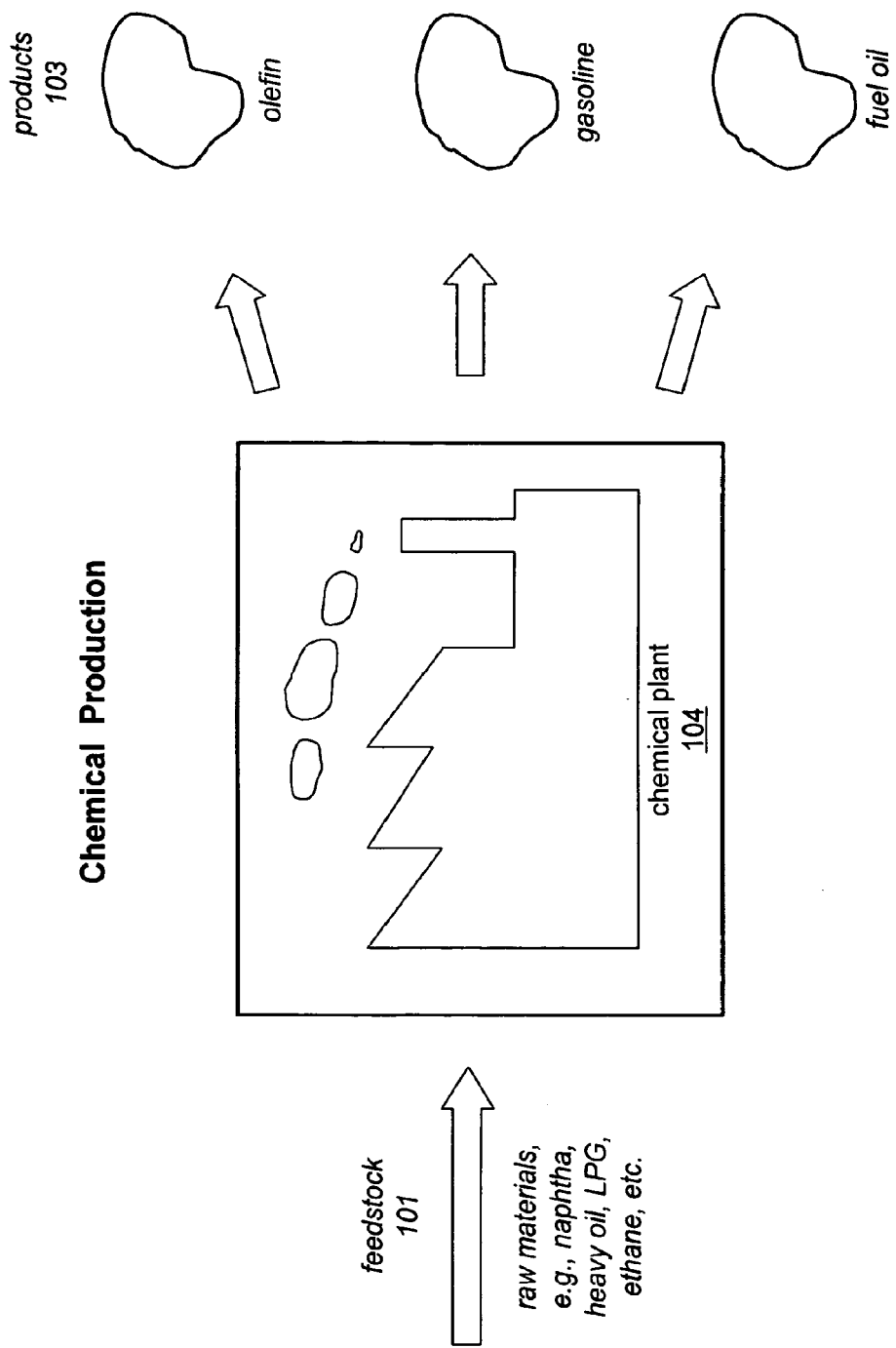
FIG. 1 illustrates an industrial process, according to the prior art.
Figure 2A:
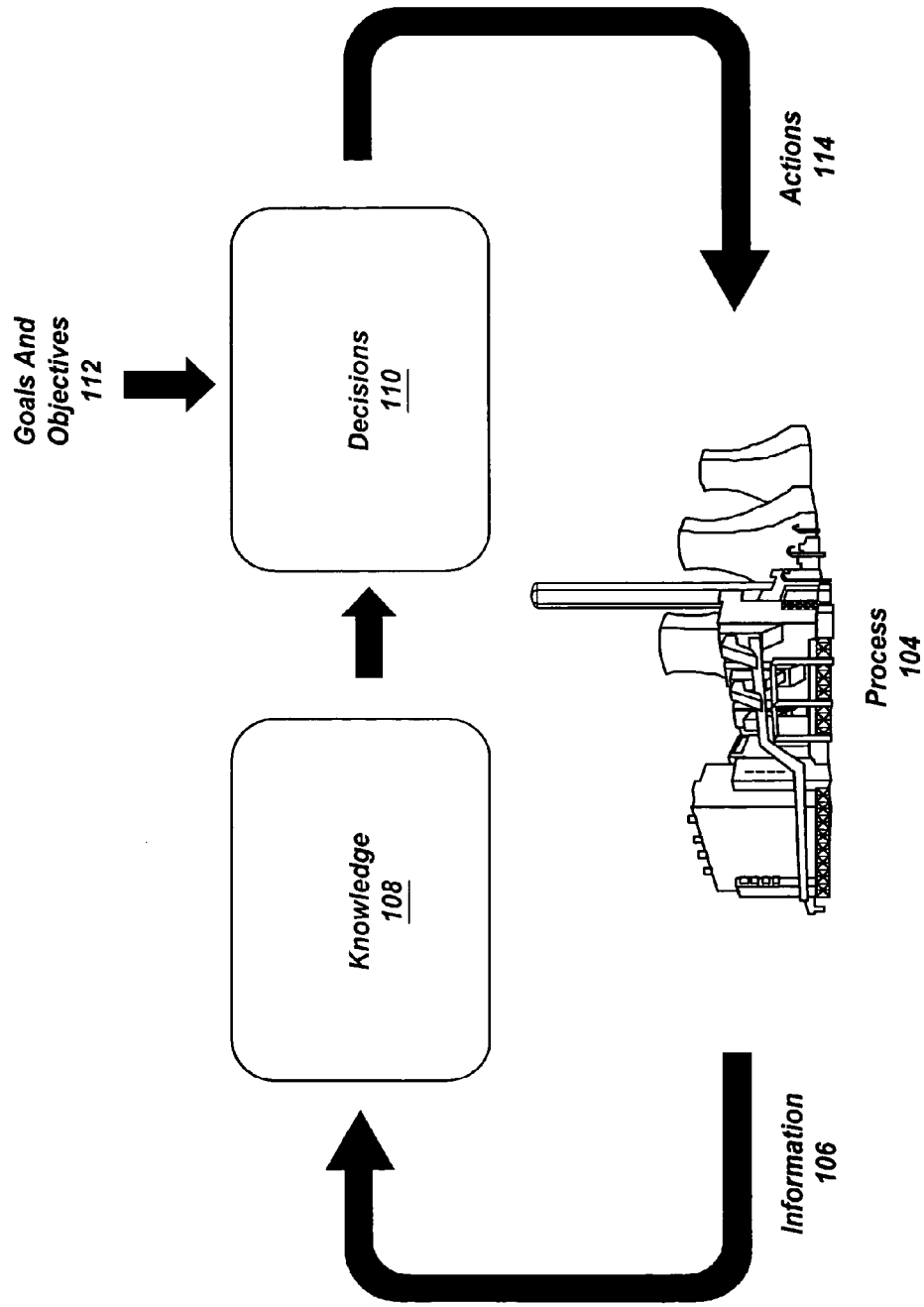
FIG. 2A illustrates a general optimization process as applied to an industrial process 104, such as a manufacturing plant, according to the prior art.
Figure 3A:
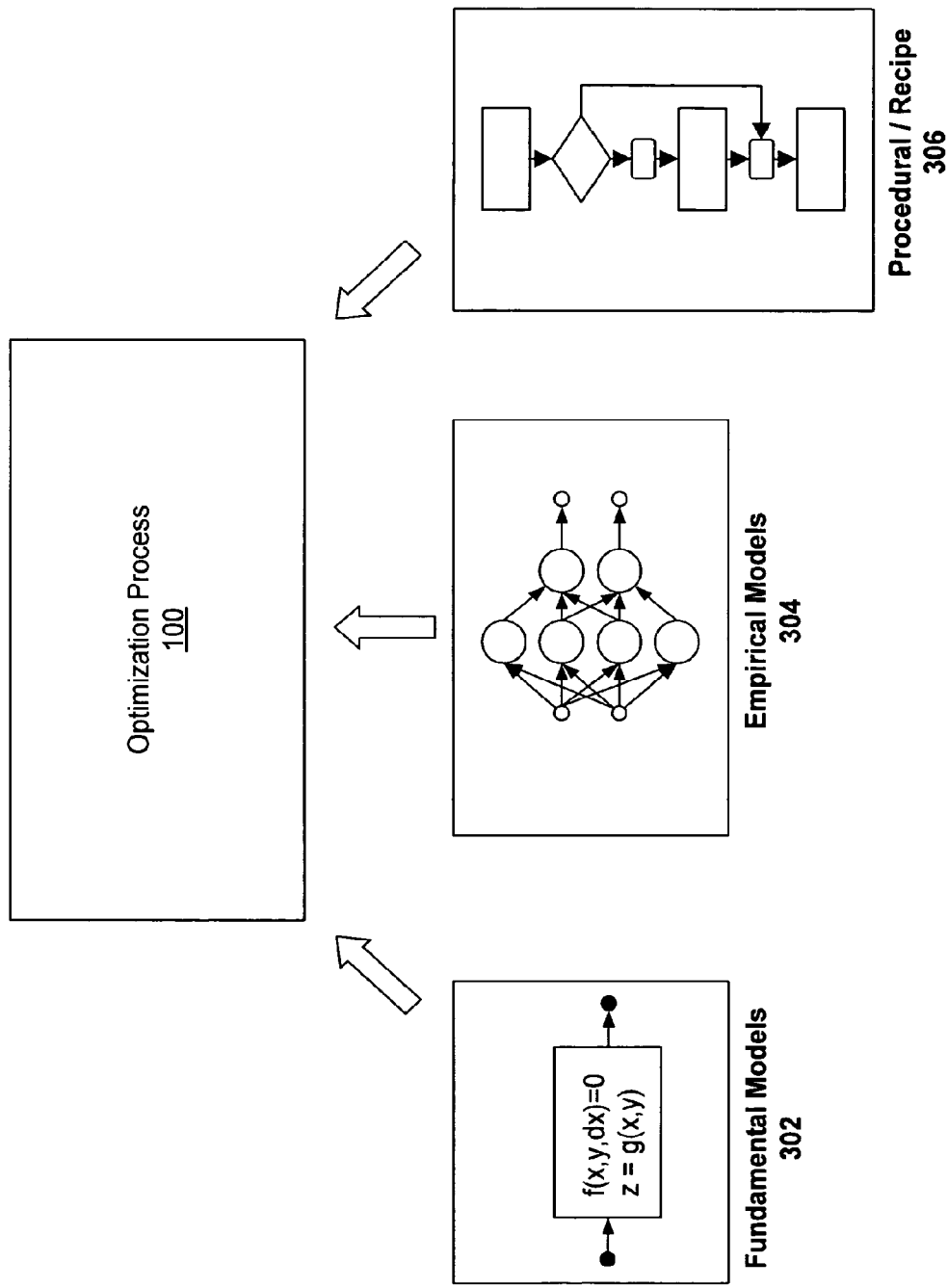
FIG. 3A illustrates a number of predictive model types usable in optimization systems, according to the prior art.
Figure 3B:
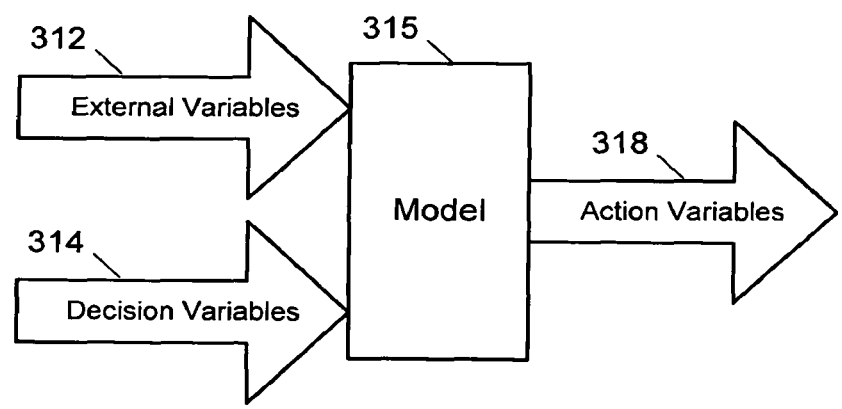
FIG. 3B is a block diagram of a predictive model as used in an optimization system 100, according to the prior art.
Figure 4A:
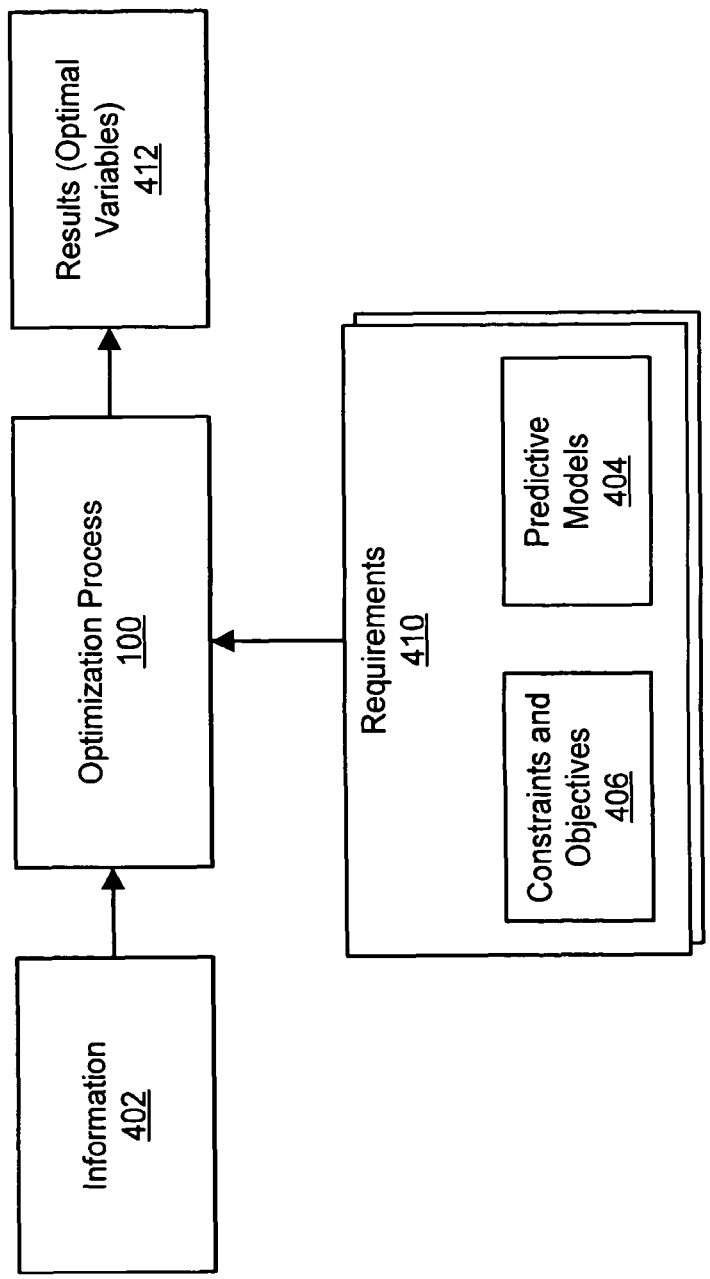
FIGS. 4A and 4B illustrate a general optimization system and process using predictive models with an optimizer to generate optimal manipulated variables, according to the prior art.
Figure 4B:
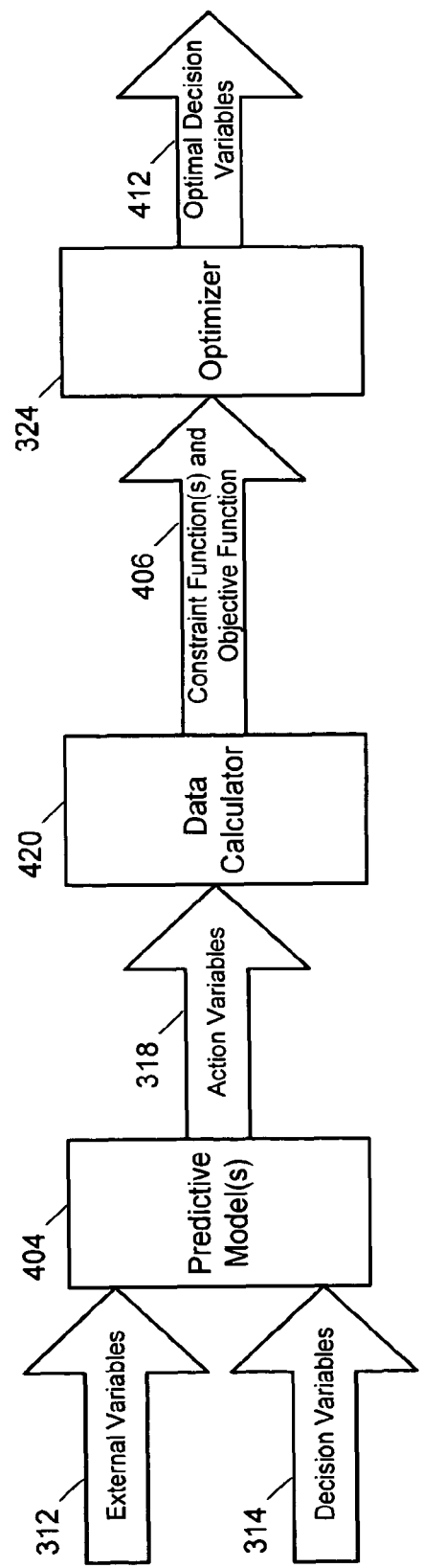
Figure 5:
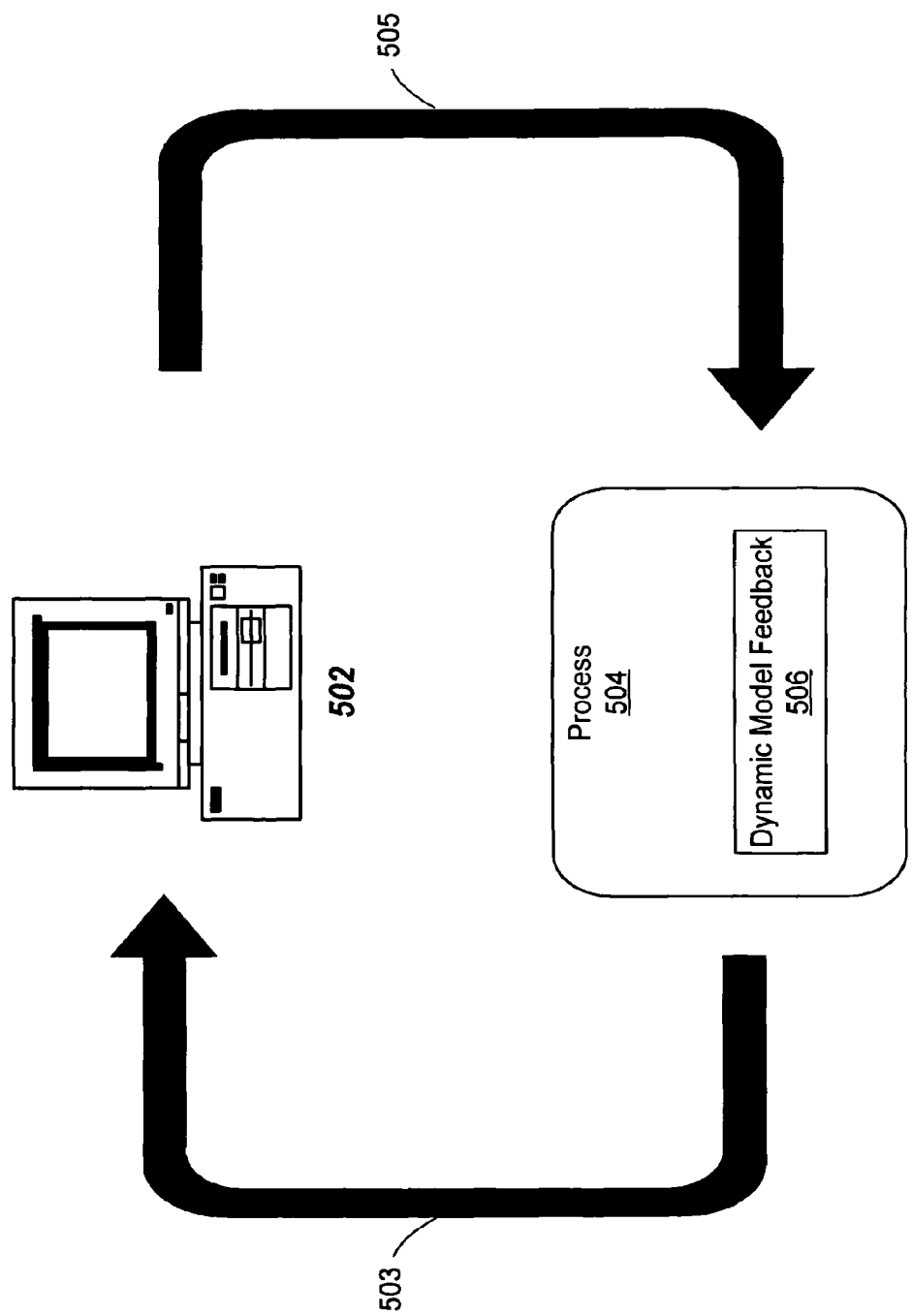
FIG. 5 illustrates an optimization system where a computer based optimization system operates in conjunction with a process and a dynamic model feedback to optimize the process, according to the prior art.
Figure 6:
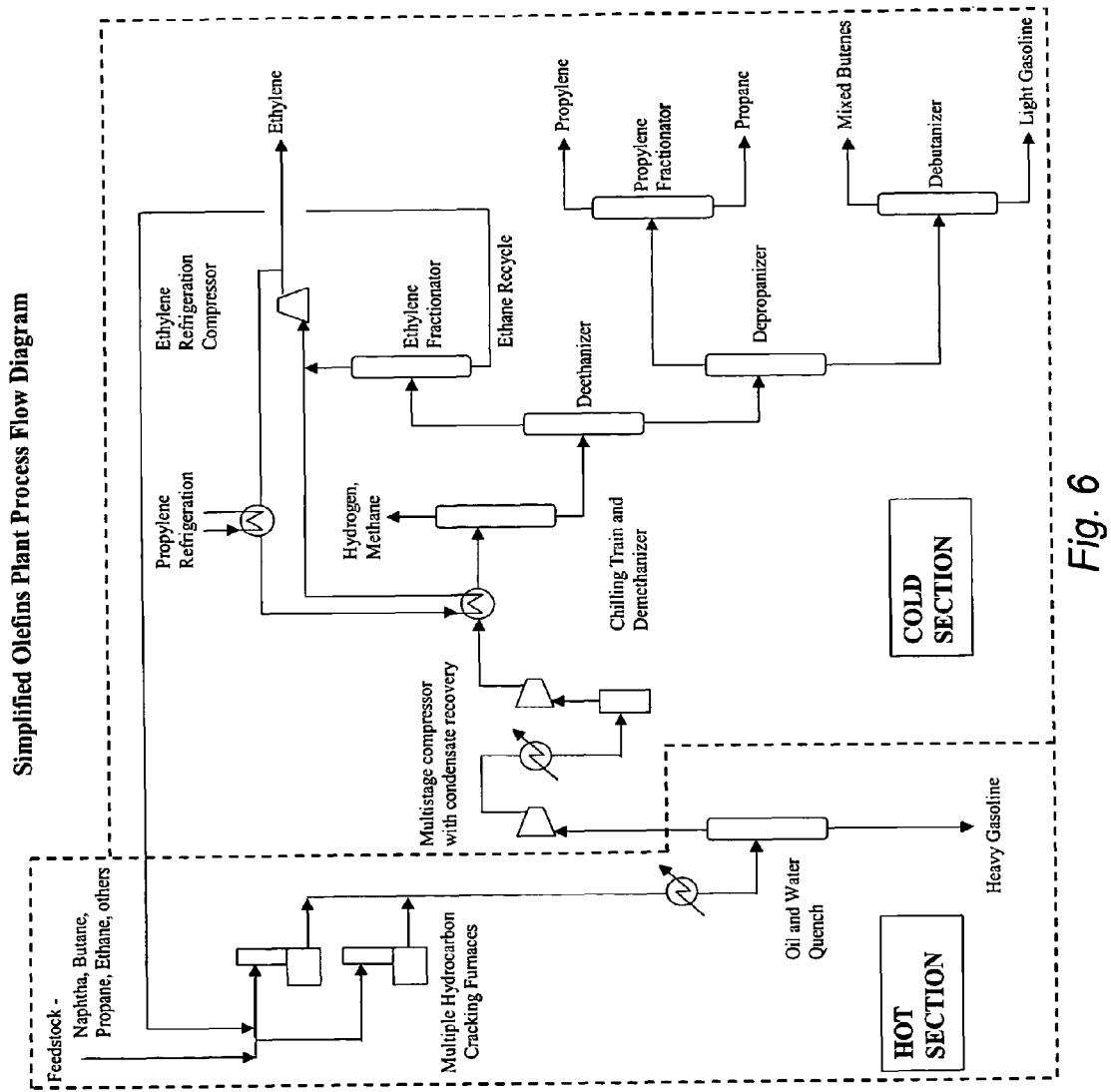
FIG. 6 illustrates an exemplary system for olefins manufacture, according to the prior art.

U.S. application Ser. No. 09/827,838 titled "System and Method for Enterprise Modeling, Optimization and Control" and filed Apr. 5, 2001, whose inventors are Edward Stanley Plumer, Bijan Sayyar-Rodsari, Carl Anthony Schweiger, Ralph Bruce Ferguson II, William Douglas Johnson, and Celso Axelrud, is hereby incorporated by reference as though fully and completely set forth herein.

U.S. application Ser. No. 10/225,093 titled "System and Method for Real-Time Enterprise Optimization" and filed August 21, 2002, whose inventors are Robert S. Golightly, John P. Havener, Ray D. Johnson, James D. Keeler and Ralph B. Ferguson, is hereby incorporated by reference as though fully and completely set forth herein.

Terms

Capacity—Capacity is the established maximum production rate of the process or unit under best operating conditions (no abnormal constraints). Capacity is a constant within the present capital investment. For new units it is the vendor's specified capacity. For established units, capacity is established by demonstrated historical production rates.

Constraints—Constraints represent limitations on particular operating variables or conditions that affect the achievable production rate of a production unit. Constraints are of two types: Controllable and External, defined below. Constraints come in many forms including but not limited to the list below:

1. Safety constraints that ensure the safety of equipment and personnel.
2. Bottleneck constraints such as the maximum open position of a control valve or other equipment limitations to the physical throughput of the unit.
3. Equipment availability and readiness due to maintenance planning and scheduling or due to unexpected equipment casualties.
4. Authorized production level set by the supply chain and production scheduling systems.
5. Personnel constraints on the availability of staffing and support functions.
6. Business rules and constraints imposed by contract and policy.
7. Business execution constraints imposed by the time required to execute associated business and contractual tasks and obligations.
8. Control constraints on the maximal position and rate of change of manipulated variables.
9. Supply chain constraints on the availability of raw materials, energy and production supplies.
10. Environmental Permit and Legal constraints on air emissions, waste water, and waste disposal systems.
11. Environmental constraints imposed upon the performance of the unit such as river levels and current weather imposed limitations.

Controllable Constraints—Controllable constraints are constraints imposed on the performance of the process or unit over which the management of the process or unit does have authority and discretionary control. As an example, the maximum throughput in a dryer might be constrained by outlet pressure, in turn limited by bag house back pressure. The bag house back pressure is a function of how often the filters are changed, and it is at management's discretion of when to change the filters, thereby changing the throughput constraint.

External Constraints—External constraints are limitations imposed on the performance of the process or unit over which the management of the process or unit does not have authority or discretionary control. These external constraints come in two types: external constraints that are controllable by other entities or processes in the plant or in the supply chain, and those constraints that are imposed by physical, safety, environmental, or legal constraints and are not controllable by anyone in the plant or supply chain.

Objective Function—The objective function sets the goals for the overall operation of the process or unit. The objective function provides one or several consistent numerical metric(s) to which the process or unit strives to achieve and over which the performance of the process or unit may be measured, e.g., from a business standpoint.

Control Variables—Control variables (also called controlled variables) are those variables that the controller/optimizer tries to bring to some objective, e.g., to a target value, maximum, etc.

Manipulated Variables—Manipulated variables are those variables over which the management of the process or unit has authority and control, and which are moved or manipulated by the controller/optimizer to achieve the targets or goals of the control variables. These variables are the actual control variables whose settings are limited by the constraints. This is in distinction from controllable constraints in the sense that manipulated variables may operate within some range of controllable or fixed constraints.

Set Point—The set point is the target signal or value for a manipulated variable.

Disturbance Variables—Disturbance variables are measured or unmeasured variables over which the management of the process or unit does not have direct authority or control. For example, temperature, humidity, upstream flow or quality, may all be referred to as measured disturbance variables. Unmeasured poisons to a catalyst bed is an example of an unmeasured disturbance variable.

Control System—The control system is the mechanism by which the manipulated variables are driven to the set points.

Response—The response is the measurement of the current position of the manipulated variable. The response is the feedback of the movement of the manipulated variable to the set point in response to the actions of the control system in its effort to achieve the set point.

Performance Metric—A performance metric is a calculated or measured value of an interesting or key indicator of the operation of the process or unit. For example, common performance metrics include: throughput (production rate), quality, amount of off-spec material produced, cost of production, downtime, emissions or waste production, production efficiency, and conversion, among others.

Model Biases—Parameter offsets that normalize a model's predictions to actual operating values. For example, a model's bias may be the difference between the model's predicted value for a parameter or attribute, and the actual value at runtime. These biases may thus be added to the model's predicted values to bring the model into compliance or calibration with the actual process.

Multivariable Predictive Control and Optimization

In preferred embodiments of the present invention, multivariable predictive control, which may be referred to as an advanced process controller (APC), and optimization technologies and methodologies, such as dynamic optimization, may be used to improve some aspects or attributes of a chemical manufacturing process, such as, for example, product yields and mixes, profitability, efficiency, and so forth, among others. The various techniques described below are directed to an exemplary application, specifically, olefin, i.e., alkene, production, although it should be noted that the techniques described are broadly applicable in other manufacturing domains as well, such as, for example, polymer production, pharmaceuticals, and other hydrocarbon-based chemical products, among others, where the process may include downstream and/or upstream constraints.

It should be noted that while some of the control and optimization components may be described or represented as single integrated components, i.e., control and optimization functionalities comprised in a single software application, other configurations of these functionalities, e.g., as distinct applications or modules, are also contemplated. One exemplary integrated optimization and control application, referred to as an integrated controller/optimizer (ICO), is Process Perfecter®, provided by Pavilion Technologies, which provides control and optimization functionality in a single application, and may be used to reduce process variability and continually improve plant performance based on real-time plant data. More specifically, Process Perfecter® may be used to optimize and perform closed-loop dynamic control on continuous industrial processes, such as production, energy, and environmental processes, using non-linear modeling technologies such as neural networks, support vector machines, etc. Using process data in the form of empirical models, this product optimizes based on current operating conditions, targets, constraints, and objectives, as described in detail above. It should be noted that while neural networks (analog or digitally implemented) are used in the embodiments described herein, any other types of non-linear empirical modeling technologies may be used as desired, including, for example, support vector machines, statistical models, etc.

As another example, computation and analysis software components may be utilized in some embodiments of the present invention, e.g., to provide various supporting calculations for the optimization and control methodologies described herein. An exemplary computation and analysis tool that may be suitable for such use is Process Insights™, also provided by Pavilion Technologies, although any other software program or programs may be used as desired.

Figure 7:
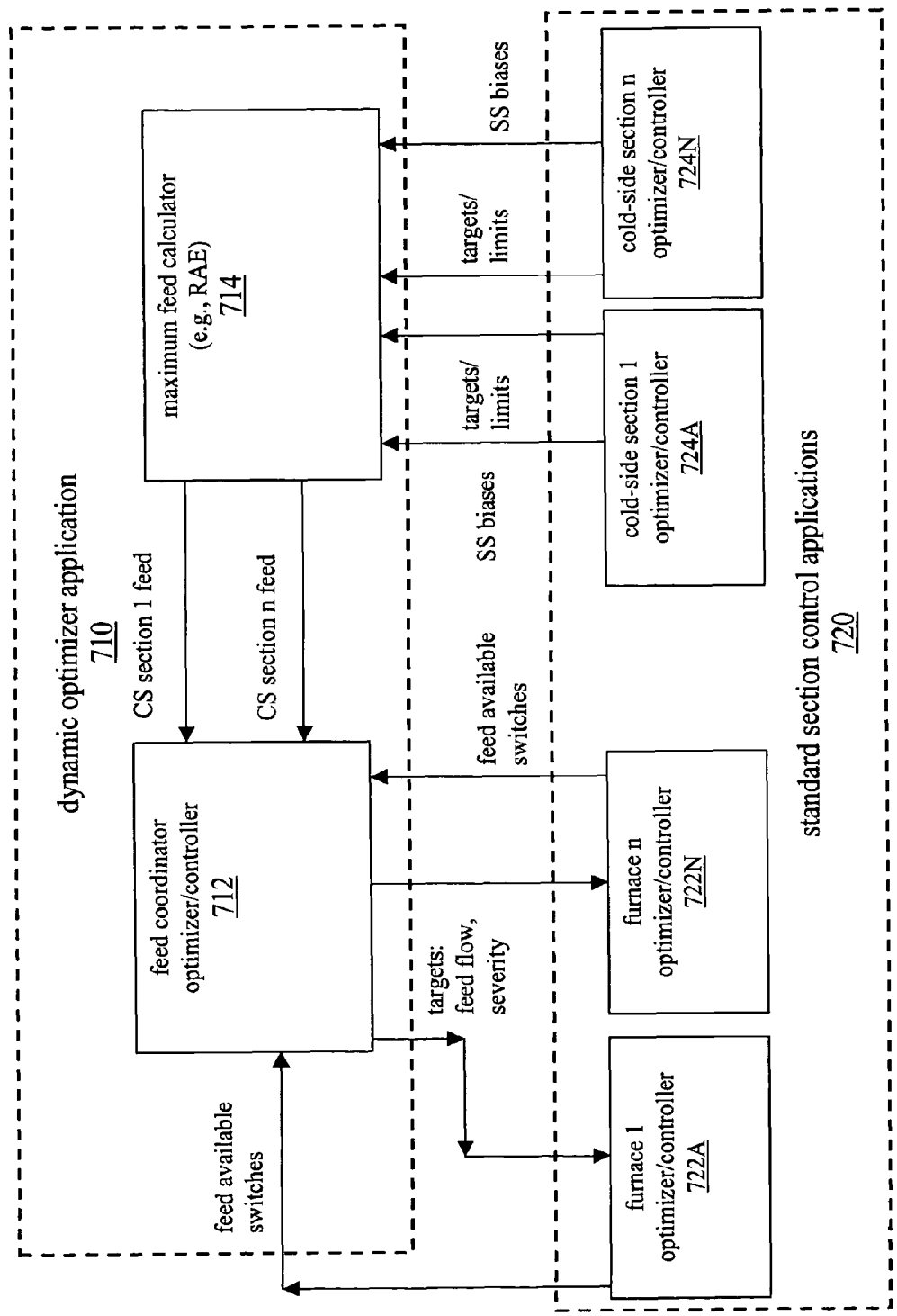
FIG. 7 illustrates a system for control and optimization of a chemical manufacturing plant, according to one embodiment.
Figure 8:
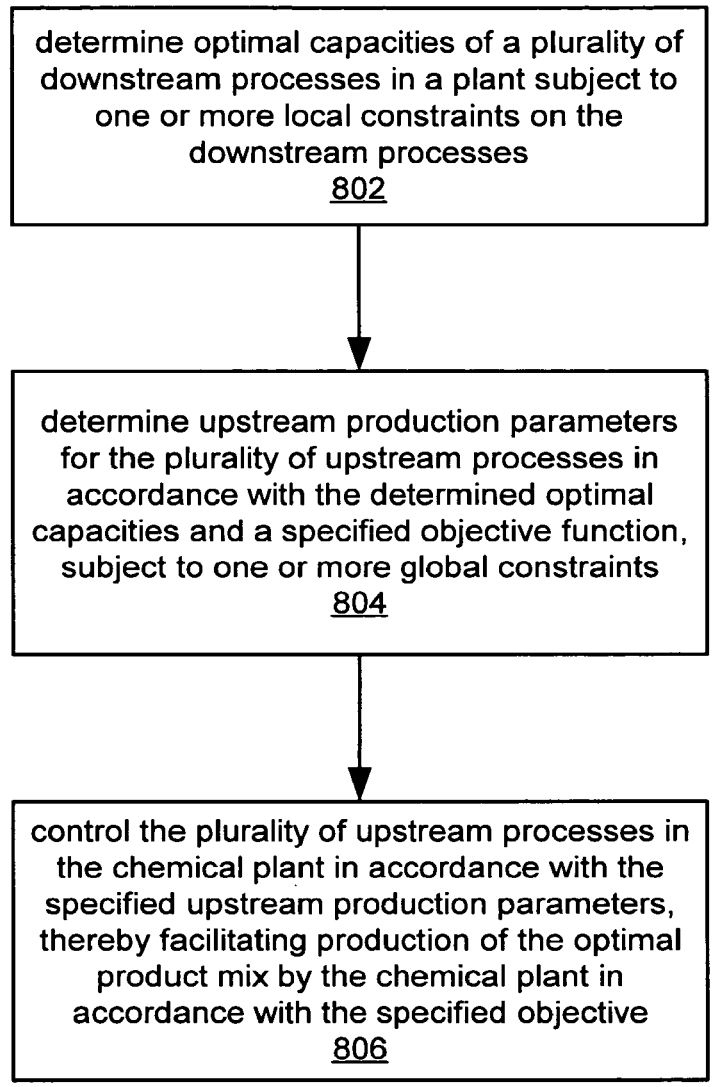
FIG. 8 is a flowchart diagram of a method for dynamic optimization of a chemical manufacturing process, according to one embodiment.

FIGS. 7 and 8—System and Method for Multivariable Predictive Control of a Chemical Manufacturing Process FIG. 7 illustrates an exemplary system, e.g., a software system, for multivariable predictive control of a chemical manufacturing process, according to one embodiment. FIG. 8 is a high level flowchart of a method of use for such a system, according to one embodiment. As noted above, the systems and methods described below are directed to the production of olefins, although this is but one exemplary use of the present techniques. The various techniques disclosed herein are broadly applicable to any unit or process where capacity constraints are imposed by downstream equipment or sub-processes. As noted above, in preferred embodiments, the downstream processes include separation and purification processes, and the upstream processes include reactors, e.g., furnaces, e.g., for "cracking" feedstocks.

In preferred embodiments, the system shown in FIG. 7 may utilize APC and optimization methodologies to more effectively implement and manage production processes toward desired goals and objectives. More specifically, in preferred embodiments, overall plant optimization may be achieved by a combination of (a) individual ICO applications managing individual equipment constraints, and local optimizations, and (b) an ICO application controlling and optimizing total plant product mix. As noted above, while in the descriptions presented herein the controllers and optimizers are integrated into respective ICOs, in other embodiments, some or all of the controllers and optimizers may be separate and distinct from each other.

The dynamic optimization techniques disclosed herein take advantage of two facts about olefins units that have not traditionally been exploited for optimization. The first is the fact that the product mix is determined entirely at the furnaces and is based on feedstock composition and furnace operating conditions. Products can only be lost in the purification area (cold section); they cannot be created. The second fact is that the interactions between the different pieces of equipment in the cold section may only limit feed to those sections. Product specifications preclude relieving constraints by changing product composition. Since minimum energy use in any distillation column equates to minimum separation, operating the column at maximum allowable product impurities may, by the nature of the process, minimize energy consumption and maximize allowable feed rate.

In some embodiments, the dynamic optimization techniques presented herein may also take advantage of some unique features of the integrated controller/optimizer (ICO) described herein. For example, an ICO preferably includes a steady state model that can not only be executed as a local optimizer as the ICO is performing control, but can also be executed in a runtime environment as an external optimizer with a different objective from the controller. The dynamic optimizer may execute cold section ICO steady state models with identical constraints as the controllers but with the additional objective of maximizing feed rate to the group of equipment controlled by the ICO. ICO dynamic model biases may be shared between computer processes so that the process executing the steady state model as an optimizer may use these biases, and thus may dynamically match the steady state model with the actual process. In this way, the controller may inherently account for the process dynamics.

The collection of components and techniques described herein may be referred to as a "dynamic optimizer", although the particular components and their arrangements and use are meant to be exemplary only, and are not intended to limit the invention to any particular set or arrangement of components.

In the embodiment shown in FIG. 7, a dynamic optimizer 710 may operate in conjunction with standard section control applications 720 to optimize the production process. As FIG. 7 shows, in one embodiment, the dynamic optimizer may include two main parts: maximum feed calculator 714 that operates to perform a maximum feed calculation for each area of the cold section, and a feed coordinator 712, preferably an ICO that specifies or implements control strategies for the hot-side of the process, e.g., setting targets for feed flow, cracking severity, etc., for the hot-side ICOs. As indicated in FIG. 7, these two portions of the dynamic optimizer 710 may communicate with the standard section control applications 720, e.g., ICOs 722 controlling furnaces on the hot-side, and ICOs 724 controlling equipment on the cold side of the unit. Note that each ICO preferably includes a steady-state model of the process or sub-process being controlled. Each steady-state model may include steady-state offsets or biases (labeled "SS biases" in FIG. 7) that normalize the model's predictions to actual operating values. For example, in one simple approach, a model's bias or offset may be the difference between the model's predicted value for a parameter or attribute, and the actual value at runtime. These biases may thus be added to the model's predicted values to bring the model into compliance or calibration with the actual process. Further details of the system of FIG. 7 are provided below in the context of the method of FIG. 8.

It should be noted that in various embodiments, some of the method elements disclosed with reference to FIG. 8 may be performed concurrently, in a different order than shown, or may be omitted. Additional method elements may be performed as desired. The method may proceed as follows.

In 802, maximum feed capacities of a plurality of downstream processes in a chemical plant may be determined subject to one or more local constraints on the downstream processes. In other words, a maximum feed calculation may be performed to determine maximum feeds for each of the plurality of downstream processes, e.g., for each cold-side section, e.g., for each of a plurality of refrigeration units/distillation columns, where the determination takes into account one or more limits on the processes. For example, limits may include pressure drop across a distillation column, valve positions, and refrigeration compressor drive amperage, among others. In one embodiment, the maximum feed calculation may be performed by an analysis engine, such as a real-time analysis engine (RAE) provided by Pavilion Technologies, in conjunction with one or more steady-state models of the cold-side processes, e.g., models comprised in respective cold-side ICOs.

Maximum Feed Calculation

As noted above, the maximum feed calculation preferably uses steady-state models from the cold side section ICO applications. For example, a downstream optimizer may execute the steady state models under a variety of conditions or states to determine a solution (the maximum feeds), as is well known in the art of constrained optimization. Note that in various embodiments, respective ICOs preferably control respective cold side units (e.g., distillation columns), although in other embodiments, one or more ICOs may cover multiple units, or, an ICO may cover the entire cold section. Each ICO application is preferably configurable to improve operation of individual units subject to local process constraints (e.g., maximum feed rates, etc.).

As noted above, the control (or controlled) variables (CVs) are variables that the ICO maintains either at a setpoint or within maximum or minimum limits. It accomplishes this by adjusting manipulated variables. In other words, MVs are variables that the ICO adjusts, and are typically the setpoints of distributed control system (DCS) controllers. As also noted above, disturbance variables are those variables that affect the process but are not adjustable by the controller itself. Examples of CVs in a cold-side ICO include amount of methane in the ethylene product, amount of ethane in the bottom of the deethanizer, depropanizer pressure drop, and demethanizer reboil valve position, among others. Examples of MVs in a cold section ICO include reboil flow rate, reflux flow rate, ethylene compressor suction pressure, and refrigerant level in a chilling train heat exchanger, among others. Examples of DVs in a cold section ICO include column feed rate, cooling water temperature, and column pressure, among others.

In some embodiments, a typical cold side section ICO where all product streams are saleable products may include targets for impurities that are ideally set three standard deviations below product specifications. Operating at these targets may minimize energy consumption. Of course, in other embodiments, targets may be set otherwise as desired.

In some embodiments, a typical cold side section ICO where one or more product streams are used internally may contain additional degrees of freedom. In some cases the trade-off between energy costs and the value of saleable product recovered may be neither constant nor obvious. These trade-offs may thus be most appropriately managed by the ICO application either through local optimization or specific tuning of targets and constraints.

The dynamic optimizer 710 is primarily concerned with the maximum feed rate each area of the cold side section can handle. Typically, even stream compositions that are not fixed by product specifications have some practical limit. Thus every cold side section ICO, even those that allow stream compositions to vary, is capable of calculating a maximum feed rate. The feed maximization calculation preferably executes each ICO steady-state model in optimization mode with the feed rate as an MV. If product pricing is not used in the ICO the feed may be provided a price to encourage the optimizer to maximize it.

The feed maximization calculation may be matched to the plant by utilizing the feedback biases (e.g., calibrated offsets) from the ICOs. In this way, the calculation may be matched to the plant by the controllers themselves, thus ensuring consistency between the steady-state feed maximization and control models. Additionally, the CV and MV targets and limits used in the feed maximization calculation are preferably obtained directly from the ICOs.

As indicated above, the steady state models may be implemented using a variety of approaches, including neural networks, support vector machines, and so forth. One benefit of a neural network (NN) based ICO architecture is that if the steady-state model is a neural network model, it can be solved for outputs given a set of inputs, or conversely, for inputs given a set of target outputs. Constraints and prices may be applied to guide the solution. Additionally, several NN models may be combined into one model. In the case of the feed maximization calculation, the model may be solved for a set of inputs (the controller MVs and DVs), which achieve maximum feed rate while respecting the controller's CV targets and limits and the MV limits. In preferred embodiments, feed is treated as a manipulated variable in this calculation and assigned a positive price, which encourages it to be increased.

Note that in the case where there are multiple ICOs in the cold side section, it may not be necessary to combine models as long as the feed flow to each section is included as a DV in that section's ICO.

In preferred embodiments, the model(s) may be run or executed in a single instance of the maximum feed calculator, which in some embodiments may comprise Pavilion Technologies' Runtime Application Engine (RAE®). The output of these calculations may include a set of feed flows for each section that would allow it to achieve all targets but subject to a limiting constraint. For example, if the section were a single distillation column, the maximum feed would be that which allowed maintaining the top and bottom target compositions while reaching another constraint such as maximum reflux/reboil or maximum column pressure drop.

In some embodiments, achieving a desired set of operating modes may simply be a matter of configuration of the constraints and targets. For example, if it is desired to minimize the bottom composition when the column is not limiting but to allow this composition to be sacrificed to some extent to achieve a higher feed rate, the maximum allowable bottoms content may be passed as the target to the feed maximization calculation while the lower target may be used by the ICO during control calculations and tuned to be sacrificed if necessary.

Thus, as shown in FIG. 7, each cold side ICO 724 may provide steady state (SS) biases and targets and/or limits to the RAE 714 for use in calculating maximum feed values for each cold side section. The RAE 714 (or functional equivalent) may then determine feed targets, i.e., the maximum feed capacities, for each of the cold-side sections, as described above.

In 804, upstream production parameters for the plurality of upstream processes may be determined in accordance with the determined maximum feed capacities and a specified objective function, subject to one or more global constraints. For example, in the olefins example, where the upstream process comprise a plurality of furnaces (reactors), the upstream production parameters may include one or more of: operating temperatures, feed rates (for one or more types of feedstock) for each furnace, or any other operating parameters or attributes germane to operation of the upstream processes. Examples of an objective function include (but are not limited to) profitability, schedule, feedstock use, energy use or efficiency, optimal product mix, and so forth. Note that in some embodiments, the objective function may be more complicated, e.g., may be a combination of different aspects, e.g., an optimal product mix based on product pricing, or any other function as desired. In one embodiment, the optimal product mix may specify one or more of: ethylene production setpoint(s), propylene production setpoint(s), and one or more C4+ production setpoints, among others.

Examples of global constraints include (but or not limited to) total feedstock flow of each of a plurality of feedstocks, the ratio of each of the plurality of feedstocks to the total feed, and the maximum difference between individual upstream feeds and the average of the upstream feeds, among others.

In preferred embodiments, the upstream production parameters may be determined via constrained optimization techniques. For example, similar to the downstream constrained optimization process described above with reference to 802, an upstream optimizer may execute a plurality of steady state models of the upstream processes under a variety of conditions or states to determine a solution (the upstream production parameters). Note that in various embodiments, respective ICOs preferably control respective upstream (hot side) units (e.g., furnaces), although in other embodiments, one or more ICOs may cover multiple units, or, an ICO may cover the entire hot section. As noted above, each ICO application is preferably configurable to improve operation of individual units subject to local process constraints.

Thus, following the example of FIG. 7, the RAE 714 may transmit cold side section feed targets to the feed coordinator 712, as shown. The feed coordinator 712 may receive additional information regarding feed availability (feed available switches) for each furnace, and, may determine hot-side targets (i.e., CVs), e.g., feed flow, cracking severity, etc., for each furnace ICO 722, as indicated in FIG. 7.

Note that in preferred embodiments, the maximum feeds to each area of the cold section may be determined by executing the steady state models of the cold side ICOs in optimization mode with the feeds treated as manipulated variables (MVs). Appropriate prices may be set so that the optimizer will increase component feeds in proportion to their values until all degrees of freedom in the APC are used. The steady-state model for each cold side ICO may be matched to the plant by mapping the ICO steady-state biases to the appropriate biases in the steady-state model. MV and controlled variable (CV) limits and targets may also be mapped to the steady-state model. In performing the feed maximization calculation for a section, the maximum feed calculator 714 may use the same model as the section's ICO, thus ensuring consistency. This approach may guarantee that each section's controller is capable of maintaining its CV targets at the feed rate and feed composition delivered by the feed coordinator 712.

The feed coordinator 712 is thus an ICO that may operate as a "master" controller for the furnace ICOs, setting their feed and severity targets. The primary goal is to achieve the maximum feed for each area of the cold section subject to furnace constraints and feedstock availability. A significant advantage of using a dynamic controller in the feed maximization is the use of dynamic models, which may allow closer approach to the maximum feed limit for each downstream section.

Feed Coordinator ICO

The feed coordinator 712 is preferably implemented as an ICO. The main objective for this application is to achieve the maximum allowable feed to each downstream section of the plant. Note that if the ICO is allowed to move multiple feedstocks and/or furnace severities, it may be possible to achieve multiple downsteam constraints.

Exemplary CVs and MVs for this application are listed below, although it should be noted that other variables may be used as desired. As shown, this embodiment of the application covers a unit containing "n" furnaces, each feeding as many as "y" different feedstocks.

TABLE 1

Feed Coordinator Controlled Variables

| Description | Type | Tag |
|---|---|---|
| Max feed to section 1 | Setpoint | Calc (see description below) |
| Max feed to section 2 | Setpoint | Calc |
| Max feed to section n | Setpoint | Calc |
| Total flow of Feedstock 1 | Min/Max | Calc |
| Total flow of Feedstock n | MinMax | Calc |
| Total Feed n/Total feed | Setpoint/Min/Max | Calc |
| Ethylene Production | Setpoint or Price | |
| Propylene Production | Setpoint or Price | |
| C4+ Production (1 CV each) | Setpoint or Price | |
| Max deviation, Furn n – Avg | Setpoint/Min/Max | Calc |

TABLE 2

Feed Coordinator Manipulated/Disturbance Variables

| Description | Type | Tag |
|---|---|---|
| Furnace 1 Feedstock 1 target | MV | Feedstock 1 target in Furnace 1 ICO |
| Furnace 1 Feedstock y target | MV | Feedstock y target in Furnace 1 ICO |
| Furnace 2 Feedstock 1 target | MV | Feedstock 1 target in Furnace 2 ICO |
| Furnace n Feedstock y target | MV | Feedstock y target in Furnace n ICO |
| Furnace 1 Severity | MV | Severity target for Furnace 1 |
| Furnace n Severity | MV | Severity target for Furnace n |

As mentioned above, the feed coordinator 712 may set targets for the furnace ICO applications to control the cold side section feed rates to the maximum feed targets (determined from the feed maximization calculation). The targets set by the feed coordinator may include feed and/or severity targets, among others. Severities and/or feed types may be adjusted to vary the relative flow to different sections so as to maximize the feed to each section until all degrees of freedom are used. In some embodiments, switches in each furnace controller may allow the operator (or controller) to determine which feeds are available to be adjusted (see, e.g., the feed available switches of FIG. 7).

The feed coordinator 712 may include dynamic models between the furnace MVs and the cold side section feeds. The maximum cold side section feeds (determined from the feed maximization calculation) may be the primary CVs for the feed coordinator 712.

The feed coordinator 712 may be configured to achieve a variety of objectives. For example, if it is desired to maximize only one feed type, then only furnaces running that feed type may be put under feed coordinator control. If multiple feed types are to be maximized, all furnaces with those feed types may be put under feed coordinator control.

In some embodiments, with no other configuration provided, the feed coordinator may tend to increase the feed that gives the greatest increase in the section feeds. Priority may be given to the different feeds via the use of different tuning parameters. However, in some embodiments, for maximum benefit it may be better not to enforce any particular priority, thus allowing the controller to determine the combination of feeds that best fills the capacity of all sections of the plant subject to the available degrees of freedom.

If more control over the solution is desired, constraints and/or targets may be added to or specified for the controller. Standard CVs for controlling the solution may include (but are not limited to):

Maximum difference between individual furnace feeds and the average—Setting this target at zero may tend to keep all furnaces at the same feed rate. The actual difference may deviate from zero as individual furnaces become limited but there may be some penalty for allowing the difference to become very large. Alternatively, this variable may be kept between limits, thus allowing the controller more freedom to shift feeds but still remain within acceptable bounds.

Each feedstock total as a percentage of the total—This variable may be useful for cases where it is desired to maintain a given feedstock as a percentage of the total by setting a desired target or to keep that percentage between some bounds using minimum and maximum fuzzy limits. In some embodiments, target feed rates may be determined based a specified priority, e.g., from a user or external process, and/or the economic value of resulting products.

Total flow of each feed type—This variable may be used to ensure that the solution consumes at least the minimum amount of a feedstock but not more than is available. For a given feed type, the change in cold side section feeds for a unit change in furnace feed may be the same. Consequently, all furnaces of that feed type may tend to be moved equivalently.

Specific olefins production rates—This variable may be used to allow the dynamic optimizer to achieve target production rates when 100% plant utilization is not desired, and may also provide a means for maximizing the more valuable olefins (for example) streams when all areas of the cold side section can not be loaded. This may be particularly useful when the throughput is limited by furnace operation. The setpoints may be tuned based on relative prices of products. If it is anticipated that these will change often, then tuning parameters may be calculated based on prices read from an external database. Optionally, setpoints may be replaced with a combination of min/max constraints and prices (e.g., read from an external database).

In 806, the plurality of upstream processes in the chemical plant may be controlled in accordance with the determined upstream production parameters, thereby facilitating production of the optimal product mix by the chemical plant in accordance with the specified objective. In other words, the upstream process, e.g., furnaces, may be operated in a manner that makes maximum use of the downstream processes in attempting to meet the specified objective subject to various constraints (e.g., local and/or global). Said another way, the determining maximum feed capacities (802), the determining upstream production parameters (804), and the controlling the plurality of upstream processes (806) may implement overall chemical plant steady state optimization via one or more multivariable predictive dynamic controllers adjusting operational targets in the reactors, including target feed rates, to achieve optimum feed rates and product mix in the separation and purification processes.

Continuing with the example of FIG. 7, the hot-side ICOs may then operate in accordance with the provided targets, moving hot-side MVs as needed to meet the targets. In this manner, the furnaces may be operated in such as way as to maximize feeds to the cold side sections in accordance with the maximum feed calculations of the RAE 714.

In some embodiments, the feed to each furnace may be increased until either the downstream section feed targets are reached or until the furnace is limited, i.e., has reached capacity. Furnaces that are limited will not be able to achieve a higher feed flow, and so in some embodiments, may have a small offset between the target feed flow and the achieved flow. This offset may indicate that that furnace is at capacity, i.e., is "wound up", and so the feed coordinator should not increase its feed further. Thus, any further feed increases may instead be made to other furnaces, i.e., those that are not at capacity.

The predicted trajectories for the feed coordinator CV's may be passed to the cold side section ICOs, allowing these controllers to anticipate feed changes and better maintain targets.

Calculations of CVs

In some embodiments, the CVs may all be calculated variables. A primary functionality of the present invention is the calculation of the maximum feed to each section. Additional calculations may generate CVs that are used to further guide the solution. For example, in some embodiments, the following supporting calculations may be performed by the same application (e.g., RAE) used to calculate maximum feed to the cold side section:

Total flow of Feedstock n=sum of all Feedstock n feed to all furnaces;

Total Feed n/Total feed=Total flow of Feedstock n/Total feed to all furnaces; and Furnace n Deviation=Furnace n feed flow—Average furnace feed flow.

It should be noted that any other calculations, e.g., supporting calculations, may be performed and used as desired, those shown being exemplary calculations, and not intended to limit the calculations to any particular set of computations.

It should be noted that in preferred embodiments, the method elements 802-806 may be performed in an iterative manner to dynamically optimize operation of the chemical plant. In other words, a feedback loop between the actual plant behavior and the optimization processes described above may be established and maintained to dynamically operate the chemical plant in an optimal manner, i.e., in a manner that substantially meets specified objectives subject to local and global constraints.

Thus, various embodiments of the dynamic optimizer described herein may implement constrained optimization of downstream processes to determine maximum feeds for downstream processes of a chemical plant subject to local constraints, and constrained optimization of upstream processes in the plant may be performed, subject to the determined maximum (downstream) feeds and one or more global constraints, in order to meet a specified objective (function). Thus, by using both local and global optimization, the chemical plant may be operated in a manner that makes efficient (i.e., maximum) use of downstream capacity to meet specified objectives.

Operators and Engineers GUI, Operators' Display

In preferred embodiments, a standard Graphical User Interface (GUI) may be provided, e.g., for operators and engineers. The GUI may operate in various different modes, e.g., Operator or Engineer modes, depending upon the particular user's needs and/or privileges. For example, according to one embodiment, in both Operator and Engineer modes all parameters in the ICO may be visible, while tuning parameters may only be changeable in Engineer mode. The standard GUI may operate on or under any of various execution environments or operating systems, including, for example (but not limited to), Linux, Unix, MacOS, Microsoft Windows, Exceed X-windows emulator (for Windows), or in a X-window client remote computer, among others. In preferred embodiments, several GUIs may be used at the same time.

In some cases, a client may wish to have a display, e.g., a DCS display, resident on the operator's console for the operator's use either instead of or in addition to the GUI. Any such display or displays may be used as desired.

Thus, in various embodiments of the systems and methods described herein, dynamic optimization may operate in conjunction with APC on individual equipment throughout each process unit, e.g., each olefins unit, to optimize the overall product mix of the unit. Maximum cold side section feed rates may be determined by executing steady-state models of underlying APC applications (e.g., ICOs) in optimization mode. These targets may then be implemented by an integrated controller/optimizer, i.e., a dynamic controller, e.g., Process Perfecter®, acting as a "master" APC (or ICO) controller to all of the individual furnace APC (or ICO) controllers. This strategy may thus exploit local optimization capabilities of an integrated controller/optimizer, e.g., Pavilion Technologies' Process Perfecter®, to optimize trade-offs between product losses and energy used for separation. As described above, the product mix optimization may be constrained by maximum allowable feed rates to groups of separation equipment downstream of the reactors (e.g., furnaces) producing the product. These maximum rates may be determined by executing individual ICO controller steady state models in optimization mode with the objective of maximizing feed rate. The steady state models are preferably copies of the steady state models used in the ICO applications and may be matched to the plant by using the dynamic model biases determined by the ICO. Furthermore, all targets and limits applied to the ICO may be shared with the steady state models used in the optimization step.

While the present invention has been described with reference to particular embodiments, it may be understood that the embodiments are illustrated and that the invention scope is not so limited. Any variations, modifications, additions and improvements to the embodiments described are possible. These variations, modifications, additions and improvements may fall within the scope of the invention as detailed within the following claims.

We claim:

1. A method for chemical manufacture, comprising:
   receiving one or more local constraints from a downstream optimization controller of at least one of a plurality of downstream processes via a maximum feed calculator;
   executing, via the maximum feed calculator, one or more steady state models for the plurality of downstream processes to determine maximum feed capacities of the plurality of downstream processes in a chemical plant subject to the one or more local constraints on the downstream processes, wherein the plurality of downstream processes comprise separation and purification processes, and wherein the maximum feed capacities are determined by the one or more steady state models based on operating conditions of a plurality of individual units within the plurality of downstream processes;
   inputting the determined maximum feed capacities from the maximum feed calculator into a feed coordinator;
   executing, via the feed coordinator, one or more steady state models for a plurality of upstream processes to determine upstream production parameters for the plurality of upstream processes in accordance with the determined maximum feed capacities and a specified objective function, subject to one or more global constraints, wherein the plurality of upstream processes comprise a plurality of reactors, and wherein the upstream production parameters are determined by the one or more steady state models based on operating conditions of a plurality of individual units within the plurality of upstream processes; and
   controlling the plurality of upstream processes in the chemical plant in accordance with the determined upstream production parameters, thereby facilitating maximum production by the chemical plant in accordance with the specified objective function.

2. The method of claim 1, wherein the specified objective function comprises an optimal product mix for the chemical plant, wherein said determining upstream production parameters is further based on the determined optimal product mix.

3. The method of claim 2, wherein the specified objective function further comprises product prices.

4. The method of claim 1, wherein the chemical plant comprises an olefins production plant.

5. The method of claim 4, wherein the optimal product mix specifies one or more of:
   ethylene production setpoint(s);
   propylene production setpoint(s); and
   one or more C4+ production setpoints.

6. The method of claim 1, wherein said determining maximum feed capacities, said determining upstream production parameters, and said controlling the plurality of upstream processes implement overall chemical plant steady state optimization via a multivariable predictive dynamic controller adjusting operational targets in the reactors, including target feed rates, to achieve optimal feed rates and product mix in the separation and purification processes.

7. The method of claim 6, wherein the specified objective function comprises an optimal product mix for the chemical plant, the method further comprising:
   performing local steady state optimization of the separation and purification processes to optimize operation of the separation and purification processes at the determined maximum feed capacities and in accordance with the optimal product mix.

8. The method of claim 6, further comprising:
determining a predicted trajectory of optimal feed rates for the separation and purification processes; and
providing the predicted trajectory as input to one or more multivariable predictive dynamic controllers controlling the separation and purification processes.

9. The method of claim 6, wherein the plurality of upstream processes are controlled by one or more upstream multivariable predictive dynamic controllers, the method further comprising:
performing local steady state optimization in the upstream multivariable predictive dynamic controllers to optimize operation of the plurality of reactors at the target feed rate.

10. The method of claim 1, wherein the separation and purification processes comprise one or more of:
distillation columns; and
refrigeration units.

11. The method of claim 1, wherein the plurality of reactors comprise a plurality of furnaces.

12. The method of claim 1, wherein said controlling the plurality of upstream processes comprises controlling one or more feeds of:
feeds to the plurality of upstream processes; and
operating parameters for the plurality of upstream processes.

13. The method of claim 1, wherein said determining the maximum feed capacities of the plurality of downstream processes comprises:
receiving one or more local constraints and one or more model offsets; and
executing one or more steady state models for the downstream processes in accordance with the one or more local constraints and the one or more model offsets to determine the maximum feed capacities of the plurality of downstream processes.

14. The method of claim 13, wherein the plurality of downstream processes are controlled by one or more downstream multivariable predictive dynamic controllers comprising respective steady state models of the downstream processes, and wherein said executing the one or more steady state models comprises:
executing the steady state models of the one or more downstream multivariable predictive dynamic controllers in optimizer mode.

15. The method of claim 14, wherein the one or more local constraints and the one or more model offsets are provided by the one or more downstream multivariable predictive dynamic controllers.

16. The method of claim 15, wherein the one or more local constraints comprise one or more of:
one or more product targets for the plurality of downstream processes;
one or more limits for the plurality of downstream processes.

17. The method of claim 14, wherein said executing the one or more steady state models comprises:
executing the steady state models of the one or more downstream multivariable predictive dynamic controllers in combination under combinations of constraints in accordance with connectivity among the plurality of downstream processes.

18. The method of claim 13, wherein said executing the one or more steady state models in accordance with the one or more model offsets comprises adjusting outputs of the steady state models in accordance with the model offsets to match outputs of the chemical plant.

19. The method of claim 13, further comprising:
determining the one or more model offsets by comparing outputs of the one or more steady state models and outputs of the chemical plant.

20. The method of claim 13, wherein said determining the maximum feed capacities of the plurality of downstream processes comprises:
executing combined steady state models of the one or more downstream multivariable dynamic controllers in an optimizer.

21. The method of claim 13, wherein each of the steady state models comprises one or more of:
a neural network; and
a support vector machine.

22. The method of claim 13, wherein the steady state models comprise neural networks, wherein the neural networks are based on physical models of the downstream processes.

23. The method of claim 13, wherein the steady state models comprise neural networks, wherein the neural networks are based on empirical models of the downstream processes.

24. The method of claim 1, wherein said determining the upstream production parameters for the plurality of upstream processes comprises:
determining target feed rates for multiple types of feedstocks for the plurality of upstream processes; and
determining cracking severity for each of the upstream processes.

25. The method of claim 1, wherein said determining target feed rates comprises determining the target feed rates based on one or more of:
a specified priority; and
economic value of resulting products.

26. The method of claim 1, wherein said controlling the plurality of upstream processes in the chemical plant in accordance with the determined upstream production parameters comprises:
each of a plurality of upstream multivariable predictive dynamic controllers controlling a respective reactor.

27. The method of claim 1, wherein the one or more global constraints comprise one or more of:
total feedstock flow of each of a plurality of feedstocks;
ratio of each of the plurality of feedstocks to the total feed; and
maximum difference between individual upstream feeds and the average of the upstream feeds.

28. The method of claim 1, further comprising:
performing said determining maximum feed capacities, said determining upstream production parameters, and said controlling the plurality of upstream processes in an iterative manner to dynamically optimize operation of the chemical plant.

29. The method of claim 1, wherein the chemical plant comprises a polymer production plant.

30. A memory medium that stores program instructions for controlling a chemical process, wherein the program instructions are computer executable to perform:
receiving one or more local constraints from a downstream optimization controller of at least one of a plurality of downstream processes via a maximum feed calculator;
executing, via the maximum feed calculator, one or more steady state models for the plurality of downstream processes to determine maximum feed capacities of the plurality of downstream processes in a chemical plant subject to the one or more local constraints on the downstream processes, wherein the plurality of downstream processes comprise separation and purification processes, and wherein the maximum feed capacities are determined by the one or more steady state models based on operating conditions of a plurality of individual units within the plurality of downstream processes;

executing, via the feed coordinator, one or more steady state models for a plurality of upstream processes to determine upstream production parameters for the plurality of upstream processes in accordance with the determined maximum feed capacities and a specified objective function, subject to one or more global constraints, wherein the plurality of upstream processes comprise a plurality of reactors, and wherein the upstream production parameters are determined by the one or more steady state models based on operating conditions of a plurality of individual units within the plurality of upstream processes; and controlling the plurality of upstream processes in the chemical plant in accordance with the determined upstream production parameters, thereby facilitating maximum production by the chemical plant in accordance with the specified objective function.

31. The method of claim 16, wherein the one or more local constraints comprise one or more product targets for the plurality of downstream processes.

32. The method of claim 16, wherein the one or more local constraints comprise one or more limits for the plurality of downstream processes.

33. The method of claim 27, wherein the one or more global constraints comprise total feedstock flow of each of a plurality of feedstocks.

34. The method of claim 27, wherein the one or more global constraints comprise ratio of each of the plurality of feedstocks to the total feed.

35. The method of claim 27, wherein the one or more global constraints comprise maximum difference between individual upstream feeds and the average of the upstream feeds.

* * * * *